(12) United States Patent
Ellis

(10) Patent No.: US 11,358,521 B2
(45) Date of Patent: Jun. 14, 2022

(54) VEHICLE WHEEL UNITS

(71) Applicant: UATC, LLC, San Francisco, CA (US)

(72) Inventor: Johad Husseini Ellis, Pittsburgh, PA (US)

(73) Assignee: UATC, LLC, Mountain View, CA (US)

( * ) Notice: Subject to any disclaimer, the term of this patent is extended or adjusted under 35 U.S.C. 154(b) by 707 days.

(21) Appl. No.: 16/171,864

(22) Filed: Oct. 26, 2018

(65) Prior Publication Data

US 2020/0047664 A1    Feb. 13, 2020

Related U.S. Application Data

(60) Provisional application No. 62/748,874, filed on Oct. 22, 2018, provisional application No. 62/716,047, filed on Aug. 8, 2018.

(51) Int. Cl.
| | |
|---|---|
| *B60Q 1/32* | (2006.01) |
| *B60Q 1/50* | (2006.01) |
| *B60Q 1/54* | (2006.01) |
| *B60B 7/00* | (2006.01) |
| *B60Q 1/26* | (2006.01) |
| *B60Q 5/00* | (2006.01) |

(52) U.S. Cl.
CPC .............. *B60Q 1/326* (2013.01); *B60B 7/006* (2013.01); *B60Q 1/2603* (2013.01); *B60Q 1/503* (2013.01); *B60Q 1/54* (2013.01); *B60Q 5/006* (2013.01)

(58) Field of Classification Search
CPC ...... B60Q 1/326; B60Q 1/2603; B60Q 1/503; B60Q 1/54; B60B 7/06; B60B 5/006

USPC .......................................................... 701/70
See application file for complete search history.

(56) References Cited

U.S. PATENT DOCUMENTS

| | | | |
|---|---|---|---|
| 1,758,826 A | 5/1930 | Dellert | |
| 1,911,224 A | 5/1933 | Dellert | |
| 2,132,279 A | 10/1938 | Wicknick et al. | |

(Continued)

FOREIGN PATENT DOCUMENTS

| | | | | |
|---|---|---|---|---|
| CN | 103764471 A | * | 4/2014 | ........ B60W 50/0098 |
| CN | 203623483 | | 6/2014 | |

(Continued)

OTHER PUBLICATIONS

Tianjun et al., "Vehicle State Estimation Based on Unscented Kalman State Estimation," 2008, vol. 1, Publisher: IEEE.*

(Continued)

*Primary Examiner* — Tuan C To
(74) *Attorney, Agent, or Firm* — Dority & Manning, P.A.

(57) ABSTRACT

Systems, methods, tangible non-transitory computer-readable media, and devices associated with the operation of a vehicle are provided. For example, a wheel unit system can receive vehicle data including information associated with states of a vehicle. Further, the vehicle can include wheel wells associated with wheel units that are configured to generate indications associated with the states of the vehicle. The wheel unit system can also determine indications to generate on the wheel units based at least in part on the vehicle data. Furthermore, the wheel unit system can generate the indications on the wheel units. The indications can, for example, include visual indications or auditory indications.

20 Claims, 8 Drawing Sheets

(56) References Cited

U.S. PATENT DOCUMENTS

| | | | |
|---|---|---|---|
| 2,563,347 A | 8/1951 | Long | |
| 2,642,119 A | 6/1953 | Dary | |
| 3,463,539 A | 8/1969 | Racine et al. | |
| 3,632,161 A | 1/1972 | Arfaras et al. | |
| 3,637,253 A | 1/1972 | Maule et al. | |
| 5,653,262 A | 8/1997 | Hanemaayer | |
| 5,738,408 A | 4/1998 | Wu | |
| 6,030,037 A | 2/2000 | Ritch et al. | |
| 6,264,261 B1 | 7/2001 | Krafcik | |
| 6,278,363 B1 * | 8/2001 | Bezek | B60C 23/0416 340/442 |
| 6,338,518 B1 | 1/2002 | D'Annunzio et al. | |
| 6,350,972 B1 | 2/2002 | Wright et al. | |
| 6,446,005 B1 * | 9/2002 | Bingeman | A63B 24/0021 180/167 |
| 6,540,279 B1 | 3/2003 | Bargiel | |
| 6,925,679 B2 | 8/2005 | Wallach et al. | |
| 7,066,519 B2 | 6/2006 | Rhodes et al. | |
| 7,090,274 B1 | 8/2006 | Khan et al. | |
| 7,156,442 B2 | 1/2007 | McManus et al. | |
| 7,264,371 B1 * | 9/2007 | Seagriff | B60Q 1/2615 362/396 |
| 8,010,230 B2 | 8/2011 | Zini et al. | |
| 8,182,016 B2 | 5/2012 | Kaip et al. | |
| 8,186,735 B2 | 5/2012 | Maceri et al. | |
| 9,256,852 B1 | 2/2016 | Myllymaki | |
| 9,510,682 B2 | 12/2016 | Hasegawa et al. | |
| 9,533,625 B2 | 1/2017 | Krishnan et al. | |
| 10,053,001 B1 * | 8/2018 | Nabbe | B60Q 1/50 |
| 2003/0182996 A1 * | 10/2003 | Bankart | B60C 23/0427 73/146 |
| 2005/0028543 A1 | 2/2005 | Whitehead et al. | |
| 2005/0099287 A1 * | 5/2005 | So | B60Q 1/34 340/815.45 |
| 2006/0016110 A1 * | 1/2006 | Nakatani | G09F 21/04 40/587 |
| 2007/0058257 A1 * | 3/2007 | Lynam | B60R 1/088 359/604 |
| 2007/0156540 A1 | 7/2007 | Koren et al. | |
| 2008/0185893 A1 | 8/2008 | Behrens et al. | |
| 2009/0069977 A1 * | 3/2009 | Markyvech | B60Q 1/346 701/41 |
| 2010/0052374 A1 | 3/2010 | Bell et al. | |
| 2010/0302794 A1 * | 12/2010 | Oomen | F21V 7/0025 362/519 |
| 2014/0262644 A1 * | 9/2014 | Browne | F16D 65/847 188/264 AA |
| 2015/0006005 A1 | 1/2015 | Yu et al. | |
| 2015/0021898 A1 * | 1/2015 | Serbinski | B62D 25/163 280/851 |
| 2015/0145668 A1 * | 5/2015 | Salter | B60C 23/02 340/475 |
| 2015/0266411 A1 * | 9/2015 | Bennie | G07C 5/008 701/36 |
| 2015/0379468 A1 | 12/2015 | Danaher | |
| 2016/0280095 A1 | 9/2016 | Frye et al. | |
| 2017/0354996 A1 | 2/2017 | Lim et al. | |
| 2017/0166111 A1 * | 6/2017 | Baccarin | F21S 43/14 |
| 2017/0166173 A1 | 6/2017 | Lauffer et al. | |
| 2017/0274712 A1 * | 9/2017 | Salter | B60C 23/0406 |
| 2018/0079278 A1 | 3/2018 | Kirpichnikov et al. | |
| 2018/0141487 A1 * | 5/2018 | Osumi | F21S 43/239 |
| 2018/0203443 A1 * | 7/2018 | Newman | B60L 1/00 |

FOREIGN PATENT DOCUMENTS

| | | | |
|---|---|---|---|
| CN | 105189313 | | 12/2015 |
| CN | 206968375 U | * | 2/2018 |
| CN | 108349429 A | * | 7/2018 ............... B60Q 1/52 |
| DE | 4200476 | | 7/1993 |
| DE | 19822694 | | 11/1999 |
| DE | 102010055365 | | 7/2011 |
| DE | 102017122311 A1 | * | 3/2018 ............... B60Q 1/02 |
| EP | 1247473 | | 10/2002 |
| EP | 2258579 | | 8/2010 |
| FR | 2920011 | | 2/2009 |
| JP | 6270307 | | 12/2013 |
| JP | 6262937 | | 1/2014 |
| KR | 100783510 | | 6/2007 |
| WO | WO2012060462 | | 5/2012 |
| WO | WO2017156586 | | 9/2017 |

OTHER PUBLICATIONS

Shreyas et al., "Adaptive Headlight System for Accident Prevention," 2014, Publisher: IEEE.*

* cited by examiner

VEHICLE WHEEL UNITS

RELATED APPLICATIONS

The present application is based on and claims benefit of U.S. Provisional Patent Application No. 62/748,874 having a filing date of Oct. 22, 2018 and U.S. Provisional Patent Application No. 62/716,047 having a filing date of Aug. 8, 2018, which are incorporated by reference herein.

FIELD

The present disclosure relates generally to wheel units that indicate the state of a vehicle.

BACKGROUND

Vehicles, including autonomous vehicles, are often equipped with various vehicle control systems that are used to perform various functions. The vehicle control systems can be used in conjunction with a variety of sensors that facilitate performance of these functions by the autonomous vehicle. However, the functions an autonomous vehicle is expected to perform can change over time. As such, there exists a need for an autonomous vehicle that is able to more effectively perform those functions by adapting to its environment and the demands placed upon the autonomous vehicle by that environment and its users.

SUMMARY

Aspects and advantages of embodiments of the present disclosure will be set forth in part in the following description, or may be learned from the description, or may be learned through practice of the embodiments.

An example aspect of the present disclosure is directed to a computer-implemented method of operating a vehicle. The computer-implemented method can include receiving, by a computing system including one or more devices, vehicle data including information associated with one or more states of a vehicle. The vehicle can include one or more wheel wells associated with one or more wheel units configured to generate one or more indications associated with the one or more states of the vehicle. The computer-implemented method can also include determining, by the computing system, the one or more indications to generate on the one or more wheel units based at least in part on the vehicle data. Furthermore, the computer-implemented method can include generating, by the computing system, the one or more indications on the one or more wheel units.

Another example aspect of the present disclosure is directed to a computing device including: one or more processors; a memory including one or more computer-readable media, the memory storing computer-readable instructions that when executed by the one or more processors cause the one or more processors to perform operations. The operations can include receiving vehicle data including information associated with one or more states of a vehicle. The vehicle can include one or more wheel wells associated with one or more wheel units configured to generate one or more indications associated with the one or more states of the vehicle. The operations can also include determining the one or more indications to generate on the one or more wheel units based at least in part on the vehicle data. Furthermore, the operations can include generating the one or more indications on the one or more wheel units.

Another example aspect of the present disclosure is directed to one or more tangible non-transitory computer-readable media storing computer-readable instructions that when executed by one or more processors cause the one or more processors to perform operations. The operations can include receiving vehicle data including information associated with one or more states of a vehicle. The vehicle can include one or more wheel wells associated with one or more wheel units configured to generate one or more indications associated with the one or more states of the vehicle. The operations can also include determining the one or more indications to generate on the one or more wheel units based at least in part on the vehicle data. Furthermore, the operations can include generating the one or more indications on the one or more wheel units.

Other example aspects of the present disclosure are directed to other systems, methods, vehicles, apparatuses, tangible non-transitory computer-readable media, and devices for operating a vehicle.

The autonomous vehicle technology described herein can help improve the safety of passengers of an autonomous vehicle, improve the safety of the surroundings of the autonomous vehicle, improve the experience of the rider and/or operator of the autonomous vehicle, as well as provide other improvements as described herein. Moreover, the autonomous vehicle technology of the present disclosure can help improve the ability of an autonomous vehicle to effectively provide vehicle services to others and support the various members of the community in which the autonomous vehicle is operating, including persons with reduced mobility and/or persons that are underserved by other transportation options. Additionally, the autonomous vehicle of the present disclosure may reduce traffic congestion in communities as well as provide alternate forms of transportation that may provide environmental benefits.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
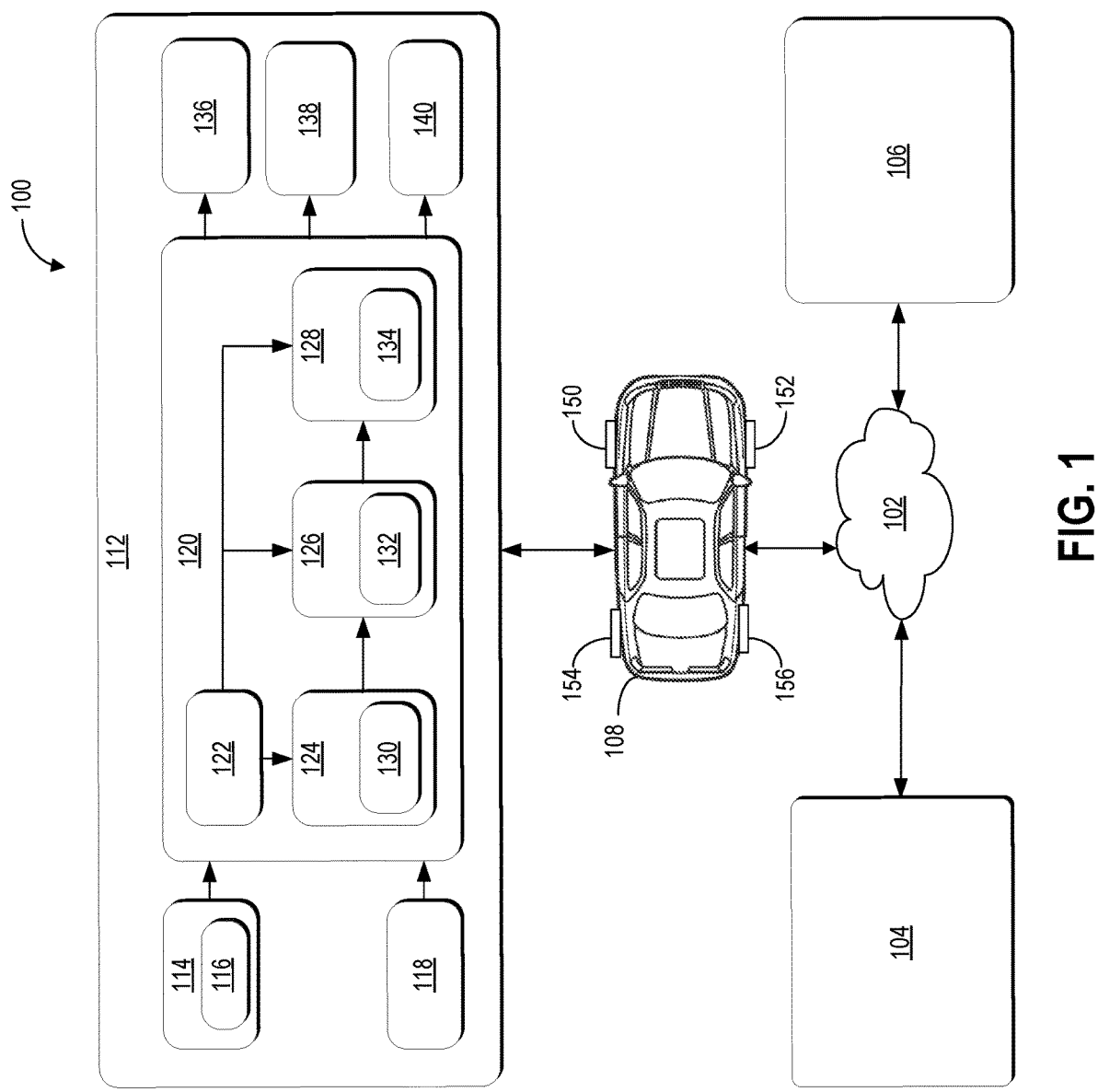
FIG. 1 depicts a diagram of an example system according to example embodiments of the present disclosure.

Example aspects of the present disclosure are directed to wheel units for a vehicle including an autonomous vehicle, a semi-autonomous vehicle, or a manually operated vehicle, in which the wheel units can perform various operations including providing an indication of the current or future state of the vehicle including a travel path or vehicle motion states. As such, the disclosed technology can perform one or more operations to more efficiently indicate the state of a vehicle, thereby improving a vehicle's overall safety and efficiency of travel through a transportation network. In particular, aspects of the present disclosure can include a wheel unit system associated with one or more computing devices that can be configured to control the operation of the wheel unit. The wheel unit system of the disclosed technology can be attached to the wheel wells of a vehicle and can receive vehicle data including information associated with states of a vehicle including the velocity and/or direction of travel of the vehicle. The wheel unit system of the disclosed technology can also determine indications to generate on wheel units based on the vehicle data. The wheel unit system can then generate the determined indications on the wheel units, including for example, images such as arrows to indicate a future turn direction for a vehicle.

By way of example, a computing system associated with wheel units (e.g., devices that can be attached to and cover the wheel wells of a vehicle) can receive vehicle data from an automobile via a wired or wireless connection to the vehicle. As a vehicle (e.g., an automobile) approaches an intersection, vehicle data sent from the vehicle to the computing system can include information indicating that the vehicle will make a right turn in four seconds. The computing system associated with the wheel units can determine that lighting elements (e.g., light emitting diodes) of the wheel units on the right side of the vehicle will be activated and blink to indicate that the vehicle will be making a right turn shortly. The wheel units can then generate the illuminated indications to show that the vehicle will make the right turn shortly. Accordingly, the disclosed technology allows for improved communication of the current and future state of a vehicle in a location (e.g., proximate to the vehicle's wheel wells) that is readily visible to observers external to the vehicle.

The disclosed technology can include a wheel unit system associated with a computing system (e.g., one or more computing devices that includes one or more processors and a memory) that can process, generate, and/or exchange (e.g., send and/or receive) signals or data, including signals or data exchanged with various devices including one or more vehicles, vehicle components (e.g., wheel units, motor, brakes, steering, and/or transmission), and/or remote computing devices (e.g., one or more vehicles, smart phones, laptop computing devices, tablet computing devices, and/or wearable devices).

For example, the wheel unit system can exchange one or more signals (e.g., electronic signals) and/or data with one or more vehicle systems including one or more wheel units (e.g., devices that cover a portion of a wheel well and can receive signals or data and generate indications associated with a travel state of the vehicle (e.g., visible indications and/or audible indications), vehicle access systems (e.g., one or more attachment and/or locking mechanisms associated with the wheel units); illumination systems (e.g., headlights, internal lights, signal lights, and/or tail lights); sensor systems that can generate output based on the state of the vehicle and/or the physical environment external to the vehicle and which can include one or more LIDAR devices, cameras, tactile sensors, microphones, radar devices, and/or sonar devices; communication systems (e.g., wired or wireless communication systems that can exchange signals or data with other devices including various vehicles); navigation systems (e.g., devices that can receive signals from GPS, GLONASS, or other systems used to determine a vehicle's geographical location); notification systems (e.g., devices used to provide notifications including one or more display devices, status indicator lights, and/or audio output systems); braking systems (e.g., brakes of the vehicle including mechanical and/or electric brakes); propulsion systems (e.g., motors and/or engines including internal combustion engines or electric engines); and/or steering systems used to change the trajectory, path, course, or direction of travel of the vehicle.

The wheel unit system can receive vehicle data including information associated with one or more states of a vehicle. Further, the vehicle can include one or more wheel wells associated with one or more wheel units (e.g., one or more devices that can be attached to the one or more wheel wells) configured to generate one or more indications associated with the one or more states of the vehicle. For example, the vehicle can include a computing system that monitors one or more states of the vehicle (e.g., vehicle velocity, acceleration, location, and/or direction of travel) and can transmit (e.g., via a wired or wireless connection) vehicle data including some of the one or more states of the vehicle to the one or more wheel units.

In some embodiments, the one or more wheel units can include one or more lighting elements configured to illuminate based at least in part on the vehicle data. For example, each of the one or more wheel units can include one or more light emitting diodes (LEDs) that can emit light based at least in part on the vehicle data. In some implementations, the intensity of the illumination can be based at least in part on the vehicle data.

In some embodiments, the one or more lighting elements can cast light on a portion of ground (e.g., project light onto the ground) proximate to the vehicle. For example, to indicate that the vehicle will turn left, the one or more lighting elements on the one or more wheel units on the left side of the vehicle can project light onto the ground surface on the left side of the vehicle.

In some embodiments, the vehicle data can further include information associated with one or more states of an environment proximate to the vehicle, an occupancy status of the vehicle, a velocity of the vehicle, an acceleration of the vehicle, a deceleration of the vehicle, a current direction of travel of the vehicle, or a future direction of travel of the vehicle.

In some embodiments, the one or more wheel units can be attached to the one or more wheel wells by one or more attachment elements of the one or more wheel units. Further, in some embodiments, the one or more attachment elements can include one or more magnetic attachments, one or more clasps, one or more screws, one or more bolts, and/or one or more studs. Furthermore, the one or more wheel units can be detachable from the one or more wheel wells, thereby facilitating replacement and/or repair of the one or more wheel units.

The wheel unit system can determine the one or more indications to generate on the one or more wheel units based at least in part on the vehicle data. For example, the wheel unit system can receive vehicle data including information indicating that the vehicle is decelerating. Based on the information that the vehicle is decelerating, which can include a rate of deceleration, the wheel unit system can determine the one or more indications (e.g., displaying different symbols, displaying different light patterns, displaying different colors, and/or changing the intensity of light emitted from one or more lighting elements of the one or more wheel units) associated with deceleration that will be generated by the one or more wheel unit systems.

The wheel unit system can generate the one or more indications on the one or more wheel units. For example, the wheel unit system can generate one or more indications including any combination of one or more symbols (e.g., arrows, circles, squares, crosses, or other symbols displayed on display portion of the wheel unit), text symbols (e.g., text indicating one or more states of the vehicle displayed on display portion of the wheel unit), and/or auditory indications (e.g., musical tones, chimes, beeps, and/or verbal messages generated by a loudspeaker of a wheel unit).

In some embodiments, determining a size and/or shape of the one or more indications can be based at least in part on the vehicle data and can be used in determining the one or more indications to generate on the one or more wheel units based at least in part on the vehicle data. For example, the wheel unit system can determine that the shape of a first indication (e.g. an arrow) for a wheel unit will be an arrow pointing in the direction of travel when the vehicle data indicates that the vehicle is accelerating and that a second indication will be two vertical lines when the vehicle data indicates that the vehicle is decelerating.

In some embodiments, a size, a shape, and/or a color of the one or more indications can be based at least in part on a velocity of the vehicle, an acceleration of the vehicle, or a deceleration of the vehicle. By way of example, the wheel unit system can determine that the size of the one or more indications (e.g. the size of an arrow pointing in the direction of travel) is a first length (e.g., seventy five centimeters long) when the vehicle data indicates that the vehicle is accelerating and the size of the one or more indications can be a second length (e.g., thirty centimeters long) when the vehicle data indicates that the vehicle is decelerating. By way of further example, the wheel unit system can determine that the shape of the one or more indications is an arrow pointing in the direction of travel when the vehicle data indicates that the vehicle is accelerating and that the shape of the one or more indications is a square when the vehicle data indicates that the vehicle is decelerating.

In some embodiments, a size of the one or more indications can include one or more indications of a default size when the vehicle is stationary or traveling at a constant velocity, one or more indications of an increased size compared to the default size when the vehicle accelerates, or one or more indications of a decreased size compared to the default size when the vehicle decelerates. For example, the wheel unit system can determine that the size of the one or more indications (e.g. the size of an arrow pointing in the direction of travel) can increase when the vehicle data indicates that the vehicle is accelerating and the size of the one or more indications can decrease when the vehicle data indicates that the vehicle is decelerating. Furthermore, in some implementations, changes in the size of the one or more indications can be indicated dynamically so that the one or more indications transition from an initial size to a modified size with one or more intermediate sizes indicated between the initial size and the modified size.

In some embodiments, the vehicle can include a first set of the one or more wheel units and a second set of the one or more wheel units. Further, the one or more indications on the first set of the one or more wheel units can be different from the one or more indications on the second set of the one or more wheel units. For example, a vehicle with four wheels (e.g., an automobile) and four corresponding wheel wells, with two wheel wells on either side of the vehicle can have one wheel unit over each wheel well. Further, when the wheel unit system generates one or more indications for a left turn, the wheel units on the left side of the vehicle can emit light. When the wheel unit system generates one or more indications that a stationary vehicle will commence movement, all one or more indications on all four of the wheel units can emit light (e.g., flash or blink lighting elements on the wheel units), produce a sound, or display an image or text (e.g., "VEHICLE STARTING").

In some embodiments, a number of the one or more indications that is visible on the one or more wheel units can be based at least in part on the vehicle data. For example, in some implementations, the one or more wheel units can display one arrow when the vehicle data indicates that a vehicle is travelling at a velocity below thirty kilometers per hour, two arrows when the vehicle data indicates that a vehicle is travelling at a velocity greater than thirty kilometers per hour and less than seventy kilometers per hour, and three arrows when the vehicle data indicates that the vehicle is travelling at a velocity greater than seventy kilometers per hour.

In some embodiments, one or more colors of the one or more indications can be based at least in part on the vehicle data. For example, in some implementations, the color of the one or more indications can be white when the vehicle data indicates that the vehicle is stationary, green when the vehicle data indicates that the vehicle is accelerating, red when the vehicle data indicates that the vehicle is decelerating, and blue when the vehicle data indicates that the vehicle is travelling at a constant velocity.

In some embodiments, the one or more indications can include one or more symbols to indicate a direction of travel of the vehicle, an acceleration of the vehicle, or a deceleration of the vehicle. For example, in some implementations, the one or more indications can include a different symbol corresponding to different states of the vehicle including the direction of travel of the vehicle (e.g., different symbols for forward and reverse directions of travel) and/or different symbols for acceleration, deceleration, or constant velocity travel by the vehicle.

In some embodiments, the one or more symbols can include text symbols (e.g., text indicating that the velocity of the vehicle is "30 KM/H"), one or more arrows (e.g., arrows pointing in the direction of travel), one or more chevrons, one or more straight lines, and/or one or more curved lines.

Further, an orientation of the one or more symbols can be based at least in part on the direction of travel of the vehicle, the acceleration of the vehicle, and/or the deceleration of the vehicle. For example, one or more indications including an arrow can point in the direction of travel (e.g., to the front of a vehicle when the vehicle is travelling forwards and to the rear of the vehicle when the vehicle is reversing).

In some embodiments, the one or more indications can include one or more audible indications. Further, the wheel unit system can include one or more loud speakers that can generate one or more audible indications based at least in part on the vehicle data. For example, the wheel unit system can generate one or more audible indications (e.g., beeping or a pre-recorded message) indicating when the wheel unit system is within a predetermined proximity of a pedestrian.

In some embodiments, a volume and/or rate of the one or more audible indications can be based at least in part on the vehicle data. For example, the volume and rate of one or more audible indications including a beeping sound can increase in inverse relation to the vehicle's proximity to a pedestrian.

In some embodiments, the one or more audible indications can be generated prior to the vehicle commencing travel, changing direction, accelerating, decelerating, or stopping. For example, the wheel unit system can generate one or more audible indications including a pre-recorded announcement (e.g., "THIS VEHICLE WILL REVERSE IN 5 SECONDS") when the stationary vehicle is about to commence travel.

In some embodiments, the one or more indications can include one or more animated images corresponding to a velocity of the vehicle, an acceleration of the vehicle, a deceleration of the vehicle, a current direction of travel of the vehicle, or a future direction of travel of the vehicle. For example, the one or more indications can include one or more animated images of directional arrows that move in the direction of travel, or one or more animated images of rotating wheels that increase their rotational speed in response to the velocity of the vehicle.

The systems, methods, devices, and non-transitory computer-readable media in the disclosed technology can provide a variety of technical effects and benefits to the overall operation of the vehicle and the provision of more effective indication of the state of the vehicle via one or more wheel units. The disclosed technology can offer enhanced operational safety by providing one or more indications of the current or future state of a vehicle. For example, the disclosed technology can, through use of bright and easily visible indications in a location (e.g., near the wheel wells of the vehicle) that attracts the eye, provide the operators of other vehicles with an indication of the current travel state of a vehicle (e.g., acceleration or deceleration of the vehicle) or a future travel state of the vehicle (e.g., that the vehicle will turn in the next five seconds). By providing a clearly visible and/or audible indication in another location of the vehicle, the overall safety of the vehicle can be enhanced, especially when other locations for indicators (e.g., near the corners of the vehicle where front headlights and tail lights are often located) are blocked or partly obscured (e.g., blocked by objects including tree branches, other vehicles, pedestrians, leaves, dirt, and/or snow). Furthermore, the indications on the wheel units can be used to visually and/or audibly communicate the current and future state of a vehicle to autonomous vehicles that may not have a communication channel with a vehicle associated with the wheel units. As such, sensors of an autonomous vehicle can visually and/or audibly discern the current and future state of a vehicle associated with the wheel units. For example, in the absence of a wireless communication channel with a wheel unit, one or more sensors of an autonomous vehicle can determine that a vehicle will slow down or turn based on the one or more visual or audible indicators from the wheel unit.

Additionally, the disclosed technology can improve safety by providing wheel units that can act as a barrier against the intrusion of objects into the wheel wells of a vehicle. For example, the wheel units can reduce the occurrence of detritus entering the wheel wells and causing damage (e.g., tire or axle damage) that can reduce the safety of the vehicle. Further, the wheel units can improve personal safety by preventing the intrusion of hands or feet into the wheel wells. Further, blocking the intrusion of various objects into the wheel wells of the vehicle can reduce the occurrence of mechanical failure that results from interference of such objects with the operation of vehicle components inside the wheel wells.

Furthermore, the wheel units of the disclosed technology can be configured to be detachable from the vehicle. This detachability of the wheel units can facilitate replacement and/or repair of the wheel units, thereby reducing vehicle down-time and allowing for the placement of new wheel units when older wheel units have reached the end of their operational life.

Accordingly, the disclosed technology allows for benefits in vehicle operation resulting from improved vehicle safety, enhanced communication of vehicle state and future state, as well as the benefits of detachable wheel units that can be easily replaced.

Various means can be configured to perform the methods and processes described herein. For example, a computing system can include one or more vehicle data receiving units, one or more indication determination units, one or more indication generation units, and/or other means for performing the operations and functions described herein. In some implementations, one or more of the units may be implemented separately. In some implementations, one or more units may be a part of, or included in, one or more other units. These means can include one or more processors, one or more microprocessors, one or more graphics processing units, one or more logic circuits, one or more dedicated circuits, one or more application-specific integrated circuits (ASICs), programmable array logic, one or more field-programmable gate arrays (FPGAs), one or more controllers, one or more microcontrollers, and/or other suitable hardware. The means can also, or alternately, include software control means implemented with a processor or logic circuitry for example. The means can include or otherwise be able to access memory including, for example, one or more non-transitory computer-readable storage media, such as random-access memory, read-only memory, electrically erasable programmable read-only memory, erasable programmable read-only memory, one or more flash/other memory devices, one or more data registrars, one or more databases, and/or other suitable hardware.

The means can be programmed (e.g., an FPGA custom programmed to operate a wheel unit system) or configured (e.g., an ASIC custom designed and configured to operate a wheel unit system) to perform one or more algorithms for performing the operations and functions described herein. For example, the means can be configured to receive vehicle data including information associated with one or more states of a vehicle in which the vehicle includes one or more wheel wells associated with one or more wheel units configured to generate one or more indications. A vehicle data receiving unit is an example of a means for receiving such data as described herein.

The means can be configured to determine, the one or more indications to generate on the one or more wheel units based at least in part on the vehicle data. In some implementations, the means can be configured to determine one or more indications including in which a size or shape of the one or more indications is modified based at least in part on the vehicle data. Further, a size of the one or more indications can be based at least in part on a velocity of the vehicle, an acceleration of the vehicle, or a deceleration of the vehicle. In some implementations, the means can be configured to determine one or more indications in which the size of the one or more indications is a default size when the vehicle is stationary or traveling at a constant velocity, the size of the one or more indications increases from the default size when the vehicle accelerates, or the size of the one or more indications decreases from the default size when the vehicle decelerates. Further, the one or more indications can include one or more audible indications in which a volume or rate of the one or more audible indications is based at least in part on the vehicle data. An indication determination unit is an example of a means for determining such data as described herein.

Furthermore, the means can be configured to generate one or more indications on the one or more wheel units. In some implementations, the means can be configured to generate indications including one or more audible indications in which a volume or rate of the one or more audible indications is based at least in part on the vehicle data. Further, the one or more audible indications can be generated a predetermined amount of time before the vehicle commences travel, changes direction, accelerates, decelerates, or stops. An indication generation unit is an example of a means for generating such indications as described herein.

With reference now to FIGS. 1-8, example embodiments of the present disclosure will be discussed in further detail. FIG. 1 depicts a diagram of an example system 100 according to example embodiments of the present disclosure. As illustrated, FIG. 1 shows a system 100 that includes a communications network 102; an operations computing system 104; one or more remote computing devices 106; a vehicle 108; a vehicle computing system 112; one or more sensors 114; sensor data 116; a positioning system 118; an autonomy computing system 120; map data 122; a perception system 124; a prediction system 126; a motion planning system 128; state data 130; prediction data 132; motion plan data 134; a communication system 136; a vehicle control system 138; a human-machine interface 140; and wheel units 150/152/154/156.

The operations computing system 104 can be associated with a service provider that can provide one or more vehicle services to a plurality of users via a fleet of vehicles that includes, for example, the vehicle 108. The vehicle services can include transportation services (e.g., rideshare services), courier services, delivery services, and/or other types of services.

The operations computing system 104 can include multiple components for performing various operations and functions. For example, the operations computing system 104 can include and/or otherwise be associated with the one or more computing devices that are remote from the vehicle 108. The one or more computing devices of the operations computing system 104 can include one or more processors and one or more memory devices. The one or more memory devices of the operations computing system 104 can store instructions that when executed by the one or more processors cause the one or more processors to perform operations and/or functions associated with operation of a vehicle including receiving vehicle data that includes information associated with one or more states of a vehicle (e.g., the vehicle 108) that includes one or more wheel wells associated with one or more wheel units (e.g., the wheel units 150/152/154/156) configured to generate one or more indications associated with the one or more states of the vehicle; determining the one or more indications to generate on the one or more wheel units based at least in part on the vehicle data; and generating the one or more indications on the one or more wheel units.

For example, the operations computing system 104 can be configured to monitor and communicate with the vehicle 108 and/or its users to coordinate a vehicle service provided by the vehicle 108. To do so, the operations computing system 104 can manage a database that includes data including vehicle data associated with the status of vehicles including the vehicle 108; and/or passenger status data associated with the status of passengers of the vehicle. The vehicle data can include a location of a vehicle (e.g., a latitude and longitude of a vehicle), the availability of a vehicle (e.g., whether a vehicle is available to pick-up or drop-off passengers and/or cargo), or the state of objects external to a vehicle (e.g., the physical dimensions and/or appearance of objects external to the vehicle). The passenger status data can include one or more states of passengers of the vehicle including one or more locations of one or more passengers.

The operations computing system 104 can communicate with the one or more remote computing devices 106 and/or the vehicle 108 via one or more communications networks including the communications network 102. The communications network 102 can exchange (e.g., send or receive) signals (e.g., electronic signals) or data (e.g., data from a computing device) and include any combination of various wired (e.g., twisted pair cable) and/or wireless communication mechanisms (e.g., cellular, wireless, satellite, microwave, and radio frequency) and/or any desired network topology (or topologies). For example, the communications network 102 can include a local area network (e.g. intranet), wide area network (e.g. Internet), wireless LAN network (e.g., via Wi-Fi), cellular network, a SATCOM network, VHF network, a HF network, a WiMAX based network, and/or any other suitable communications network (or combination thereof) for transmitting data to and/or from the vehicle 108.

Each of the one or more remote computing devices 106 can include one or more processors and one or more memory devices. The one or more memory devices can be used to store instructions that when executed by the one or more processors of the one or more remote computing devices 106 cause the one or more processors to perform operations and/or functions including operations and/or functions associated with the vehicle 108 including exchanging (e.g., sending and/or receiving) data or signals with the vehicle 108, monitoring the state of the vehicle 108, and/or controlling the vehicle 108. The one or more remote computing devices 106 can communicate (e.g., exchange data and/or signals) with one or more devices including the operations computing system 104 and the vehicle 108 via the communications network 102. For example, the one or more remote computing devices 106 can request the location of the vehicle 108 via the communications network 102.

The one or more remote computing devices 106 can include one or more computing devices (e.g., a desktop computing device, a laptop computing device, a smart phone, and/or a tablet computing device) that can receive input or instructions from a user or exchange signals or data with an item or other computing device or computing system (e.g., the operations computing system 104). Further, the one or more remote computing devices 106 can be used to determine and/or modify one or more states of the vehicle 108 including a location (e.g., a latitude and longitude), a velocity, an acceleration, a trajectory, and/or a path of the vehicle 108 based in part on signals or data exchanged with the vehicle 108. In some implementations, the operations computing system 104 can include the one or more remote computing devices 106.

The vehicle 108 can be a ground-based vehicle (e.g., an automobile), an aircraft, and/or another type of vehicle. The vehicle 108 can be an autonomous vehicle that can perform various actions including driving, navigating, and/or operating, with minimal and/or no interaction from a human driver. The vehicle 108 can be configured to operate in one or more modes including, for example, a fully autonomous operational mode, a semi-autonomous operational mode, a park mode, and/or a sleep mode. A fully autonomous (e.g., self-driving) operational mode can be one in which the vehicle 108 can provide driving and navigational operation with minimal and/or no interaction from a human driver present in the vehicle. A semi-autonomous operational mode can be one in which the vehicle 108 can operate with some interaction from a human driver present in the vehicle. Park and/or sleep modes can be used between operational modes while the vehicle 108 performs various actions including waiting to provide a subsequent vehicle service, and/or recharging between operational modes.

An indication, record, and/or other data indicative of the state of the vehicle 108, the state of the wheel units 150/152/154/156, the state of one or more passengers of the vehicle 108, and/or the state of an environment external to the vehicle 108 including one or more objects (e.g., the physical dimensions and/or appearance of the one or more objects) can be stored locally in one or more memory devices of the vehicle 108. Furthermore, the vehicle 108 can provide data indicative of the state of the one or more objects (e.g., physical dimensions and/or appearance of the one or more objects) within a predefined distance of the vehicle 108 to the operations computing system 104, which can store an indication, record, and/or other data indicative of the state of the one or more objects within a predefined distance of the vehicle 108 in one or more memory devices associated with the operations computing system 104 (e.g., remote from the vehicle).

The vehicle 108 can include and/or be associated with the vehicle computing system 112. The vehicle computing system 112 can include one or more computing devices located onboard the vehicle 108. For example, the one or more computing devices of the vehicle computing system 112 can be located on and/or within the vehicle 108. The one or more computing devices of the vehicle computing system 112 can include various components for performing various operations and functions. For instance, the one or more computing devices of the vehicle computing system 112 can include one or more processors and one or more tangible non-transitory, computer readable media (e.g., memory devices). The one or more tangible non-transitory, computer readable media can store instructions that when executed by the one or more processors cause the vehicle 108 (e.g., its computing system, one or more processors, and other devices in the vehicle 108) to perform operations and/or functions, including those described herein for receiving vehicle data that includes information associated with one or more states of a vehicle (e.g., the vehicle 108) that includes one or more wheel wells associated with one or more wheel units (e.g., the wheel units 150/152/154/156) configured to generate one or more indications associated with the one or more states of the vehicle; determining the one or more indications to generate on the one or more wheel units based at least in part on the vehicle data; and generating the one or more indications on the one or more wheel units.

As depicted in FIG. 1, the vehicle computing system 112 can include the one or more sensors 114; the positioning system 118; the autonomy computing system 120; the communication system 136; the vehicle control system 138; and the human-machine interface 140. One or more of these systems can be configured to communicate with one another via a communication channel. The communication channel can include one or more data buses (e.g., controller area network (CAN)), on-board diagnostics connector (e.g., OBD-II), and/or a combination of wired and/or wireless communication links. The onboard systems can exchange (e.g., send and/or receive) data, messages, and/or signals amongst one another via the communication channel.

The one or more sensors 114 can be configured to generate and/or store data including the sensor data 116 associated with one or more objects that are proximate to the vehicle 108 (e.g., within range or a field of view of one or more of the one or more sensors 114). The one or more sensors 114 can include one or more Light Detection and Ranging (LIDAR) systems, one or more Radio Detection and Ranging (RADAR) systems, one or more cameras (e.g., visible spectrum cameras and/or infrared cameras), one or more sonar systems, one or more motion sensors, and/or other types of image capture devices and/or sensors. The sensor data 116 can include image data, radar data, LIDAR data, sonar data, and/or other data acquired by the one or more sensors 114. The one or more objects can include, for example, pedestrians, vehicles, bicycles, buildings, roads, foliage, utility structures, bodies of water, and/or other objects. The one or more objects can be located on various parts of the vehicle 108 including a front side, rear side, left side, right side, top, or bottom of the vehicle 108. The sensor data 116 can be indicative of locations associated with the one or more objects within the surrounding environment of the vehicle 108 at one or more times. For example, sensor data 116 can be indicative of one or more LIDAR point clouds associated with the one or more objects within the surrounding environment. The one or more sensors 114 can provide the sensor data 116 to the autonomy computing system 120.

In addition to the sensor data 116, the autonomy computing system 120 can retrieve or otherwise obtain data including the map data 122. The map data 122 can provide detailed information about the surrounding environment of the vehicle 108. For example, the map data 122 can provide information regarding: the identity and/or location of different roadways, road segments, buildings, or other items or objects (e.g., lampposts, crosswalks and/or curbs); the location and directions of traffic lanes (e.g., the location and direction of a parking lane, a turning lane, a bicycle lane, or other lanes within a particular roadway or other travel way and/or one or more boundary markings associated therewith); traffic control data (e.g., the location and instructions of signage, traffic lights, or other traffic control devices); and/or any other map data that provides information that assists the vehicle computing system 112 in processing, analyzing, and perceiving its surrounding environment and its relationship thereto.

The vehicle computing system 112 can include a positioning system 118. The positioning system 118 can determine a current position of the vehicle 108. The positioning system 118 can be any device or circuitry for analyzing the position of the vehicle 108. For example, the positioning system 118 can determine a position by using one or more of inertial sensors, a satellite positioning system, based on IP/MAC address, by using triangulation and/or proximity to network access points or other network components (e.g., cellular towers and/or Wi-Fi access points) and/or other suitable techniques. The position of the vehicle 108 can be used by various systems of the vehicle computing system 112 and/or provided to one or more remote computing devices (e.g., the operations computing system 104 and/or the remote computing device 106). For example, the map data 122 can provide the vehicle 108 relative positions of the surrounding environment of the vehicle 108. The vehicle 108 can identify its position within the surrounding environment (e.g., across six axes) based at least in part on the data described herein. For example, the vehicle 108 can process the sensor data 116 (e.g., LIDAR data, camera data) to match it to a map of the surrounding environment to get a determination of the vehicle's position within that environment (e.g., transpose the vehicle's position within its surrounding environment).

The autonomy computing system 120 can include a perception system 124, a prediction system 126, a motion planning system 128, and/or other systems that cooperate to perceive the surrounding environment of the vehicle 108 and determine a motion plan for controlling the motion of the vehicle 108 accordingly. For example, the autonomy computing system 120 can receive the sensor data 116 from the one or more sensors 114, attempt to determine the state of the surrounding environment by performing various processing techniques on the sensor data 116 (and/or other data), and generate an appropriate motion plan through the surrounding environment, including for example, a motion plan that can use the wheel units 150/152/154/156 to indicate the future travel path of the vehicle 108. The autonomy computing system 120 can control the one or more vehicle control systems 138 to operate the vehicle 108 according to the motion plan.

The autonomy computing system 120 can identify one or more objects that are proximate to the vehicle 108 based at least in part on the sensor data 116 and/or the map data 122. For example, the perception system 124 can obtain state data 130 descriptive of a current and/or past state of an object that is proximate to the vehicle 108. The state data 130 for each object can describe, for example, an estimate of the object's current and/or past: location and/or position; speed; velocity; acceleration; heading; orientation; size/footprint (e.g., as represented by a bounding shape); class (e.g., pedestrian class vs. vehicle class vs. bicycle class), and/or other state information. The perception system 124 can provide the state data 130 to the prediction system 126 (e.g., for predicting the movement of an object).

The prediction system 126 can generate prediction data 132 associated with each of the respective one or more objects proximate to the vehicle 108. The prediction data 132 can be indicative of one or more predicted future locations of each respective object. The prediction data 132 can be indicative of a predicted path (e.g., predicted trajectory) of at least one object within the surrounding environment of the vehicle 108. For example, the predicted path (e.g., trajectory) can indicate a path along which the respective object is predicted to travel over time (and/or the velocity at which the object is predicted to travel along the predicted path). The prediction system 126 can provide the prediction data 132 associated with the one or more objects to the motion planning system 128.

The motion planning system 128 can determine a motion plan and generate motion plan data 134 for the vehicle 108 based at least in part on the prediction data 132 (and/or other data). The motion plan data 134 can include vehicle actions with respect to the objects proximate to the vehicle 108 as well as the predicted movements. For instance, the motion planning system 128 can implement an optimization algorithm that considers cost data associated with a vehicle action as well as other objective functions (e.g., cost functions based on speed limits, traffic lights, and/or other aspects of the environment), if any, to determine optimized variables that make up the motion plan data 134. By way of example, the motion planning system 128 can determine that the vehicle 108 can perform a certain action (e.g., pass an object) without increasing the potential risk to the vehicle 108 and/or violating any traffic laws (e.g., speed limits, lane boundaries, signage). The motion plan data 134 can include a planned trajectory, velocity, acceleration, and/or other actions of the vehicle 108.

The motion planning system 128 can provide the motion plan data 134 with data indicative of the vehicle actions, a planned trajectory, and/or other operating parameters to the vehicle control systems 138 to implement the motion plan data 134 for the vehicle 108. For instance, the vehicle 108 can include a mobility controller configured to translate the motion plan data 134 into instructions. By way of example, the mobility controller can translate a determined motion plan data 134 into instructions for controlling the vehicle 108 including adjusting the steering of the vehicle 108 "X" degrees and/or applying a certain magnitude of braking force. The mobility controller can send one or more control signals to the responsible vehicle control component (e.g., braking control system, steering control system and/or acceleration control system) to execute the instructions and implement the motion plan data 134.

The vehicle computing system 112 can include a communications system 136 configured to allow the vehicle computing system 112 (and its one or more computing devices) to communicate with other computing devices. The vehicle computing system 112 can use the communications system 136 to communicate with the operations computing system 104 and/or one or more other remote computing devices (e.g., the one or more remote computing devices 106) over one or more networks (e.g., via one or more wireless signal connections). In some implementations, the communications system 136 can allow communication among one or more of the system on-board the vehicle 108. The communications system 136 can also be configured to enable the autonomous vehicle to communicate with and/or provide and/or receive data and/or signals from a remote computing device 106 associated with a user and/or an item (e.g., an item to be picked-up for a courier service). The communications system 136 can utilize various communication technologies including, for example, radio frequency signaling and/or Bluetooth low energy protocol. The communications system 136 can include any suitable components for interfacing with one or more networks, including, for example, one or more: transmitters, receivers, ports, controllers, antennas, and/or other suitable components that can help facilitate communication. In some implementations, the communications system 136 can include a plurality of components (e.g., antennas, transmitters, and/or receivers) that allow it to implement and utilize multiple-input, multiple-output (MIMO) technology and communication techniques.

The vehicle computing system 112 can include the one or more human-machine interfaces 140. For example, the vehicle computing system 112 can include one or more display devices located on the vehicle computing system 112. A display device (e.g., screen of a tablet, laptop and/or smartphone) can be viewable by a user of the vehicle 108 that is located in the front of the vehicle 108 (e.g., driver's seat, front passenger seat). Additionally, or alternatively, a display device can be viewable by a user of the vehicle 108 that is located in the rear of the vehicle 108 (e.g., a back passenger seat). For example, the autonomy computing system 120 can provide one or more outputs including a graphical display of the location of the vehicle 108 on a map of a geographical area within one kilometer of the vehicle 108 including the locations of objects around the vehicle 108. A passenger of the vehicle 108 can interact with the one or more human-machine interfaces 140 by touching a touch-screen display device associated with the one or more human-machine interfaces to indicate, for example, a stopping location for the vehicle 108.

Figure 2:
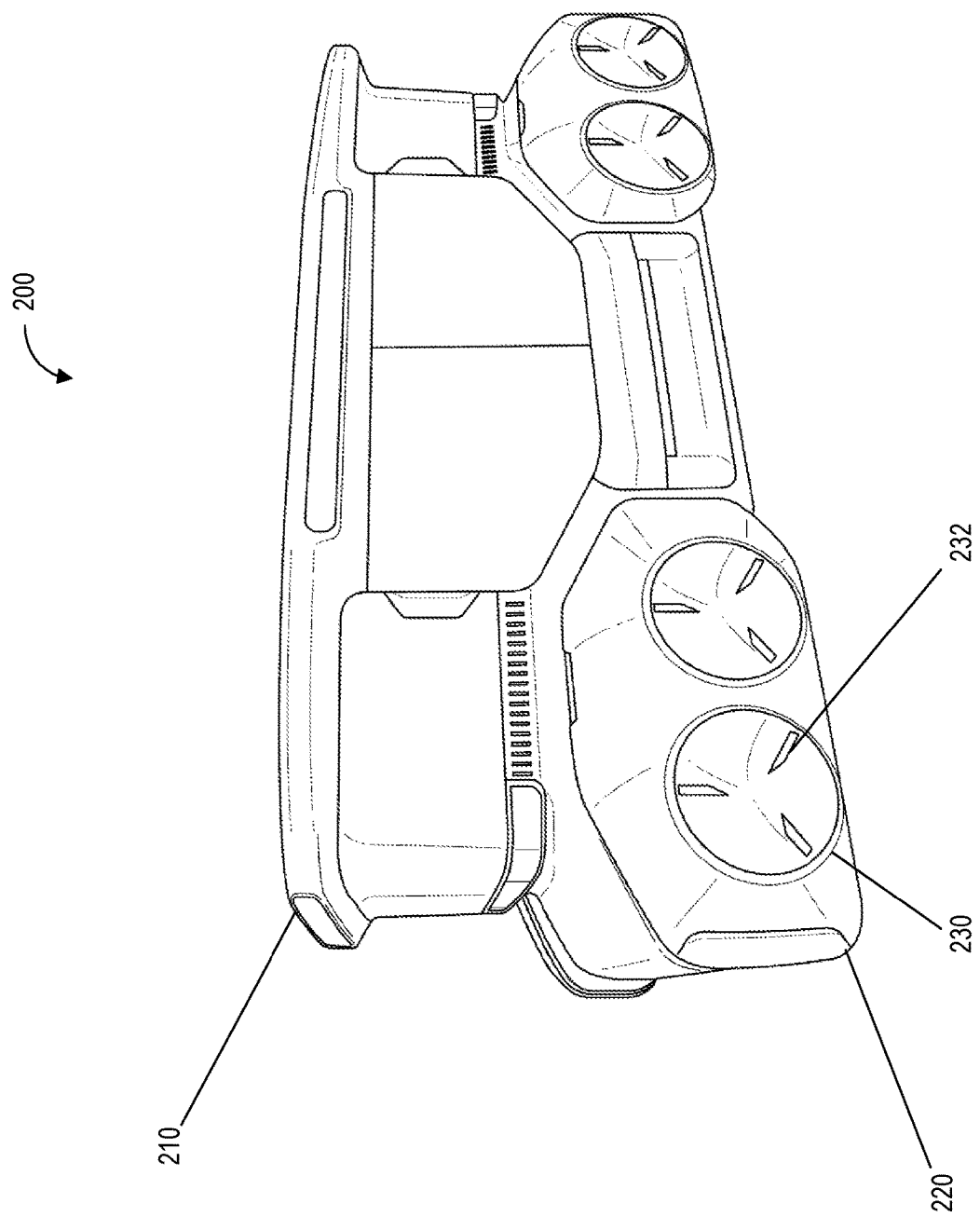
FIG. 2 depicts an example of wheel attachments according to example embodiments of the present disclosure.
Figure 6:
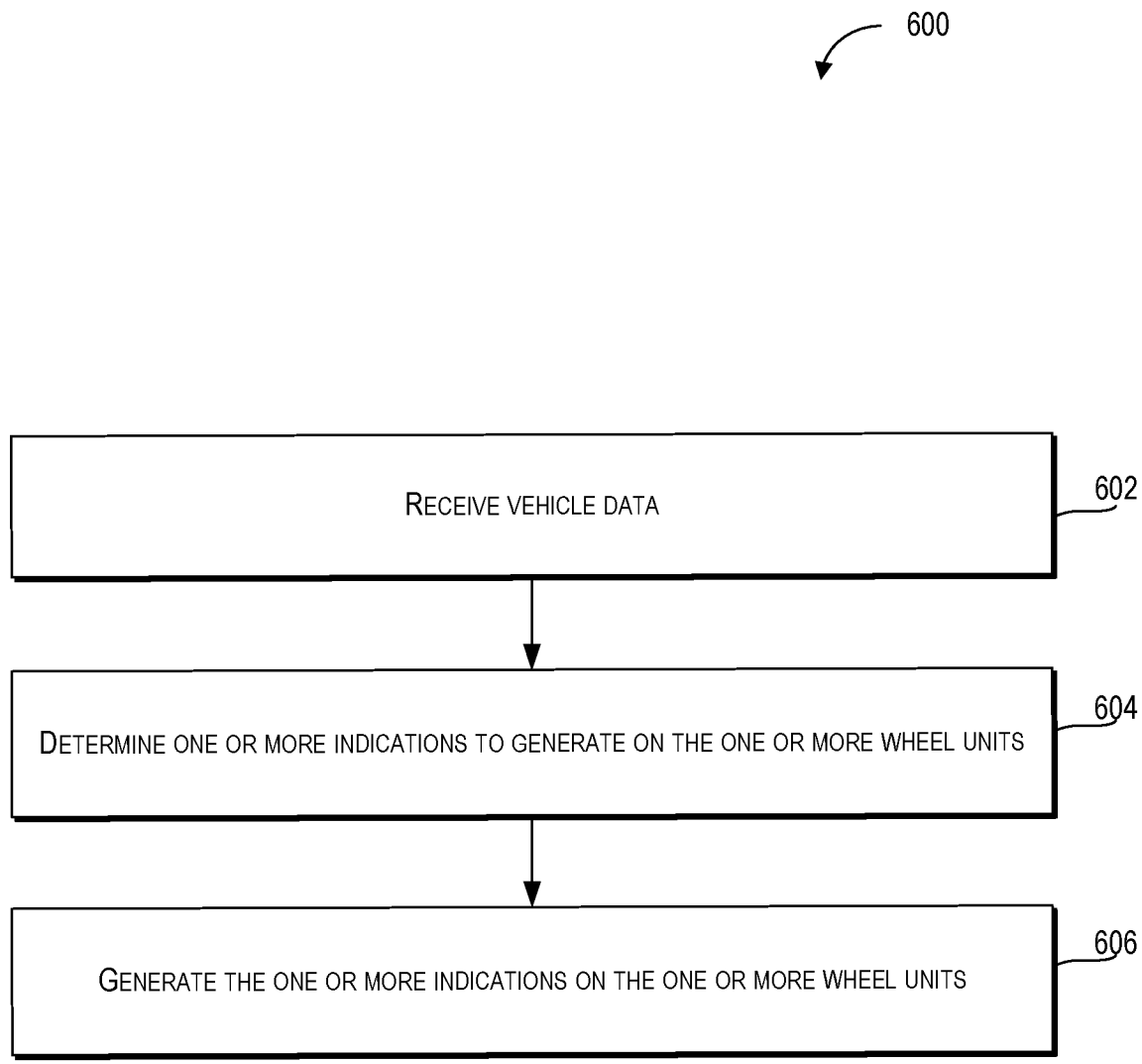
FIG. 6 depicts a flow diagram of an example method of using wheel attachments according to example embodiments of the present disclosure.

In some embodiments, the vehicle computing system 112 can perform one or more operations including activating, based at least in part on one or more signals or data (e.g., the sensor data 116, the map data 122, the state data 130, the prediction data 132, and/or the motion plan data 134) one or more vehicle systems associated with operation of the vehicle 108. For example, the vehicle computing system 112 can send one or more control signals to activate one or more vehicle systems that can be used to generate one or more indications on the wheel units 150/152/154/156 (e.g., the one or more indications 232 on the wheel unit system 200 that is depicted in FIG. 2 and/or the one or more indications described in the method 600 that is depicted in FIG. 6), and/or change the path of the vehicle 108 (e.g., sending one or more signals to an engine system and steering system of the vehicle).

By way of further example, the vehicle computing system 112 can activate one or more vehicle systems including the wheel units 150/152/154/156; the communications system 136 that can send and/or receive signals and/or data with other vehicle systems, other vehicles, or remote computing devices (e.g., remote server devices); one or more lighting systems (e.g., one or more headlights, hazard lights, and/or vehicle compartment lights); one or more vehicle safety systems (e.g., one or more seatbelt and/or airbag systems); one or more notification systems that can generate one or more notifications for passengers of the vehicle 108 (e.g., auditory and/or visual messages about the state or predicted state of objects external to the vehicle 108); braking systems; propulsion systems that can be used to change the acceleration and/or velocity of the vehicle; and/or steering systems that can change the path, course, and/or direction of travel of the vehicle 108.

The vehicle 108 and/or the vehicle computing system 112 can include and/or be associated with the wheel units 150/152/154/156 which can include one or more devices configured to generate one or more indications. Any of the wheel units 150/152/154/156 can include one or more lighting elements (e.g., LEDs, incandescent light bulbs, and/or fluorescent light bulbs which can emit light in one or more colors); one or more projection devices (e.g., one or more devices that can project one or more images onto a surface external to the vehicle 108); one or more display devices (e.g., LCD displays, OLED displays, and/or CRT displays); one or more loud audio devices (e.g., loudspeakers); and/or one or more mechanical components (e.g., portions of the wheel units 150/152/154/156 that can change position and/or vibrate to communicate one or more indications).

In some embodiments, any of the wheel units 150/152/154/156 can include a first set of the one or more wheel units and a second set of the one or more wheel units, in which the one or more indications on the first set of the one or more wheel units are different from the one or more indications on the second set of the one or more wheel units (e.g., the wheel units on the left side of the vehicle 108 can provide different indications from the wheel units on the right side of the vehicle 108).

In some embodiments, any of the wheel units 150/152/154/156 can be attached to the one or more wheel wells of the vehicle 108 by one or more attachment elements of the one or more wheel units. Further, the one or more attachment elements can include one or more magnetic attachments, one or more clasps, one or more screws, one or more bolts, and/or one or more studs. In this way any of the wheel units 150/152/154/156 can be attached and/or detached for more convenient servicing, maintenance, and/or cleaning.

In some embodiments, the one or more indications associated with any of the wheel units 150/152/154/156 can include one or more symbols to indicate a direction of travel of the vehicle 108, acceleration of the vehicle 108, or deceleration of the vehicle 108. Further, the one or more symbols can include one or more text symbols, arrows, chevrons, straight lines, and/or curved lines. Also, an orientation of the one or more symbols can be based at least in part on at least one of the direction of travel of the vehicle, the acceleration of the vehicle, or the deceleration of the vehicle.

FIG. 2 depicts an example of wheel units according to example embodiments of the present disclosure. One or more operations and/or functions in FIG. 2 can be implemented and/or performed by one or more devices (e.g., one or more computing devices) and/or systems including, for example, the operations computing system 104, the vehicle 108, or the vehicle computing system 112, which are depicted in FIG. 1. Further, the one or more devices and/or systems in FIG. 2 can include one or more features of one or more devices and/or systems including, for example, the operations computing system 104, the vehicle 108, or the vehicle computing system 112, which are depicted in FIG. 1.

As illustrated, FIG. 2 shows a wheel unit system 200 including a vehicle 210, a wheel unit 220, a display portion 230, and one or more indications 232.

In this example, the wheel unit 220 is attached to the vehicle 210 and is configured to either receive one or more signals or data from a computing system (e.g., a computing system with one or more features of the vehicle computing system 112 that is depicted in FIG. 1) associated with the vehicle 210 or determine the state of the wheel unit 220 based on one or more computing systems and/or sensors of the wheel unit 220. Further, the wheel unit 220 can receive, via a wireless and/or wired from the vehicle 210, one or more signals indicating the state of the vehicle 210 wirelessly and/or via a wired interconnection between the vehicle 210 and the wheel unit 220. For example, the wheel unit 220 can receive one or more signals indicating that the vehicle 210 is moving forward. Based on the one or more signals indicating that the vehicle 210 is moving forward, the wheel unit 220 can generate the one or more indications 232 which can include one or more lighting elements that can emit light to signal that the vehicle 210 is operational and moving forward.

Furthermore, the one or more indications 232 can emit light in different colors based at least in part on the state of the vehicle 210 and/or the wheel unit 220. For example, the one or more indications 232 can emit white colored light when the vehicle 210 is stationary, green colored light when the vehicle 210 is in motion, and red colored light when the vehicle 210 is turning to the same side as the wheel unit 220 (e.g., when the vehicle 210 is turning left). Furthermore, the one or more indications 232 can turn on and off, or dim based at least in part on one or more states of the vehicle 210. For example, the one or more indications 232 can turn off when the vehicle 210 is off, the one or more indications 232 can turn on when the vehicle 210 is on, and the intensity of the one or more indications 232 can be based at least in part on the velocity of the vehicle 210 (e.g., more intense when the vehicle is in motion). Further, the one or more indications 232 can turn off or dim when the vehicle 210 is stationary, but still operational, for some predetermined period of time. For example, the one or more indications 232 can turn off or dim when the vehicle 210 is operational and stationary for longer than five minutes.

In some embodiments, the one or more indications 232 can turn on when one or more sensors (e.g., one or more motion sensors and/or cameras) of the wheel unit 220 detect an object (e.g., a pedestrian or other vehicle) within a predetermined distance of the wheel unit 220. For example, the wheel unit 220 can activate the one or more indications 232 when a moving object is within five meters of the wheel unit 220.

In some embodiments, the one or more indications 232 on the display portion 230 can be animated to provide an indication that that the vehicle 210 is moving. For example, the one or more indications 232 can be animated to: appear to move in a counter-clockwise direction when the vehicle 210 is moving forward, appear to move in a clockwise direction when the vehicle 210 is moving backwards, and to remain static when the vehicle 210 is stationary. Furthermore, the rate at which the one or more indications 232 move on the display portion 230 can be associated with the velocity and/or acceleration of the vehicle 210. For example, the movement of the one or more indications 232 can move at a highest rate of rotation when the vehicle 210 is moving at a velocity greater than one hundred kilometers per hour, the one or more indications 232 can move at an intermediate rate of rotation when the vehicle 210 is moving at a velocity less than one hundred kilometers per hour and greater than fifty kilometers per hour, and the one or more indications 232 can move at a low rate of rotation when the vehicle 210 is moving at less than fifty kilometers per hour. Further, the movement of the one or more indications 232 can increase in rapidity when the vehicle 210 accelerates, decrease in rapidity when the vehicle 210 decelerates, and maintain a constant rapidity when the vehicle 210 is not accelerating.

In some embodiments, the wheel unit system 200 can perform one or more operations including receiving vehicle data that can include information associated with one or more states of a vehicle (e.g., the vehicle 210 and/or the vehicle 108 that is depicted in FIG. 1). The vehicle can include one or more wheel wells associated with one or more wheel units (e.g., the wheel unit 220 and/or the wheel units 150/152/154/156 depicted in FIG. 1) configured to generate one or more indications (e.g., the one or more indications 232) associated with the one or more states of the vehicle. The operations performed by the wheel unit system 200 can also include determining the one or more indications to generate on the one or more wheel units 150/152/154/156 based at least in part on the vehicle data. Furthermore, the operations performed by the wheel unit system 200 can include generating the one or more indications on the one or more wheel units 150/152/154/156.

Figure 3:
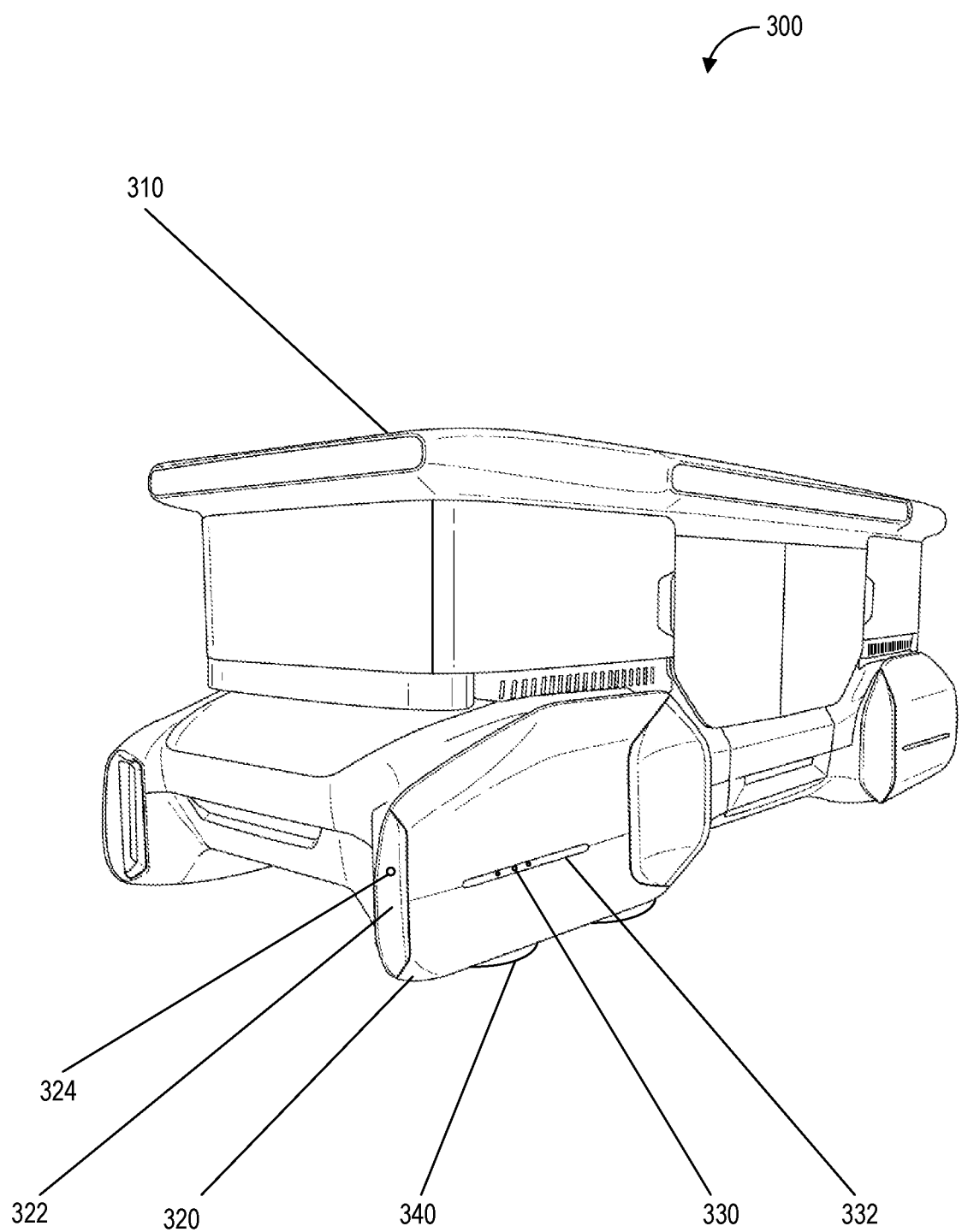
FIG. 3 depicts an example of wheel attachments according to example embodiments of the present disclosure.

FIG. 3 depicts an example of wheel units according to example embodiments of the present disclosure. One or more operations and/or functions or operations in FIG. 3 can be implemented and/or performed by one or more devices (e.g., one or more computing devices) or systems including, for example, the operations computing system 104, the vehicle 108, or the vehicle computing system 112, which are shown in FIG. 1. Further, the one or more devices and/or systems in FIG. 3 can include one or more features of one or more devices and/or systems including, for example, the operations computing system 104, the vehicle 108, or the vehicle computing system 112, which are depicted in FIG. 1.

As illustrated, FIG. 3 shows a wheel unit system 300 including a vehicle 310, a wheel unit 320, a wheel unit aperture 322, one or more indications 324, a display portion 330, one or more indications 332, and the wheel 340.

In this example, the wheel unit 320 is attached to the vehicle 310 and is configured to either receive one or more signals or data from a computing system associated with the vehicle 310 (e.g., a computing system with one or more features of the vehicle computing system 112 that is depicted in FIG. 1) or determine the state of the wheel unit 320 based on one or more computing systems and/or sensors of the wheel unit 320. Further, the wheel unit 320 can receive one or more signals indicating the state of the vehicle 310 wirelessly or via a wired interconnection between the vehicle 310 and the wheel unit 320. For example, the wheel unit 320 can receive one or more signals indicating that the vehicle 310 is travelling backwards. Based on the one or more signals indicating that the vehicle 310 travelling backwards, the wheel unit 320 can generate the one or more indications 332 which can include one or more lighting elements that can emit light to signal that the vehicle 310 is operational and travelling backwards.

The one or more indications 332 can be animated to provide an indication that that the vehicle 310 is moving. For example, the one or more indications 332 can be animated to: move along the horizontal axis of the display portion 330 in the direction of travel of the vehicle 310 (toward the front of the vehicle 310 when the vehicle 310 is moving forward and toward the rear of the vehicle 310 when the vehicle is moving backward), and remain static when the vehicle 310 is stationary. Furthermore, the rate at which the one or more indications 332 move on the display portion 330 can be associated with the velocity and/or acceleration of the vehicle 310. For example, the one or more indications 332 can appear to move along the horizontal axis of the display portion 330 most rapidly when the vehicle 310 is travelling at a velocity greater than one hundred kilometers per hour, the one or more indications 332 can appear to move at an intermediate velocity when the vehicle 310 is travelling at a velocity less than one hundred kilometers per hour and greater than fifty kilometers per hour, and the one or more indications 332 can appear to move at a lowest velocity when the vehicle 310 is travelling at less than fifty kilometers per hour. Further, the movement of the one or more indications 332 can increase in rapidity when the vehicle 310 accelerates, decrease in rapidity when the vehicle 310 decelerates, and maintain a constant rapidity when the vehicle 310 is not accelerating.

The wheel unit aperture 322 can provide ventilation to the wheel 340 and can include the one or more indications 324. The one or more indications 324 can be used to indicate that the vehicle 310 will turn (e.g., the one or more indications 324 will emit uninterrupted light or blink when the vehicle will make a turn to the same side as the one or more indications 324). Furthermore, in some embodiments, the one or more indications 324 can be positioned within the wheel unit aperture 322 such that the one or more indications 324 are only visible from certain angles and are blocked when viewed from other angles. For example, in some embodiments, the one or more indications 324 are recessed within the wheel unit aperture 322 such that the one or more indications 324 are visible from in front of the vehicle but are not visible when viewed from a position that is behind the wheel unit aperture 322.

In some embodiments, the wheel unit system 300 can perform one or more operations including receiving vehicle data that can include information associated with one or more states of a vehicle (e.g., the vehicle 310 and/or the vehicle 108 that is depicted in FIG. 1). The vehicle can include one or more wheel wells associated with one or more wheel units (e.g., the wheel unit 320 and/or the wheel units 150/152/154/156 which are depicted in FIG. 1) configured to generate one or more indications (e.g., the one or more indications 332) associated with the one or more states of the vehicle. The operations performed by the wheel unit system 300 can also include determining the one or more indications to generate on the one or more wheel units 150/152/154/156 based at least in part on the vehicle data. Furthermore, the operations performed by the wheel unit system 300 can include generating the one or more indications on the one or more wheel units 150/152/154/156.

Figure 4:
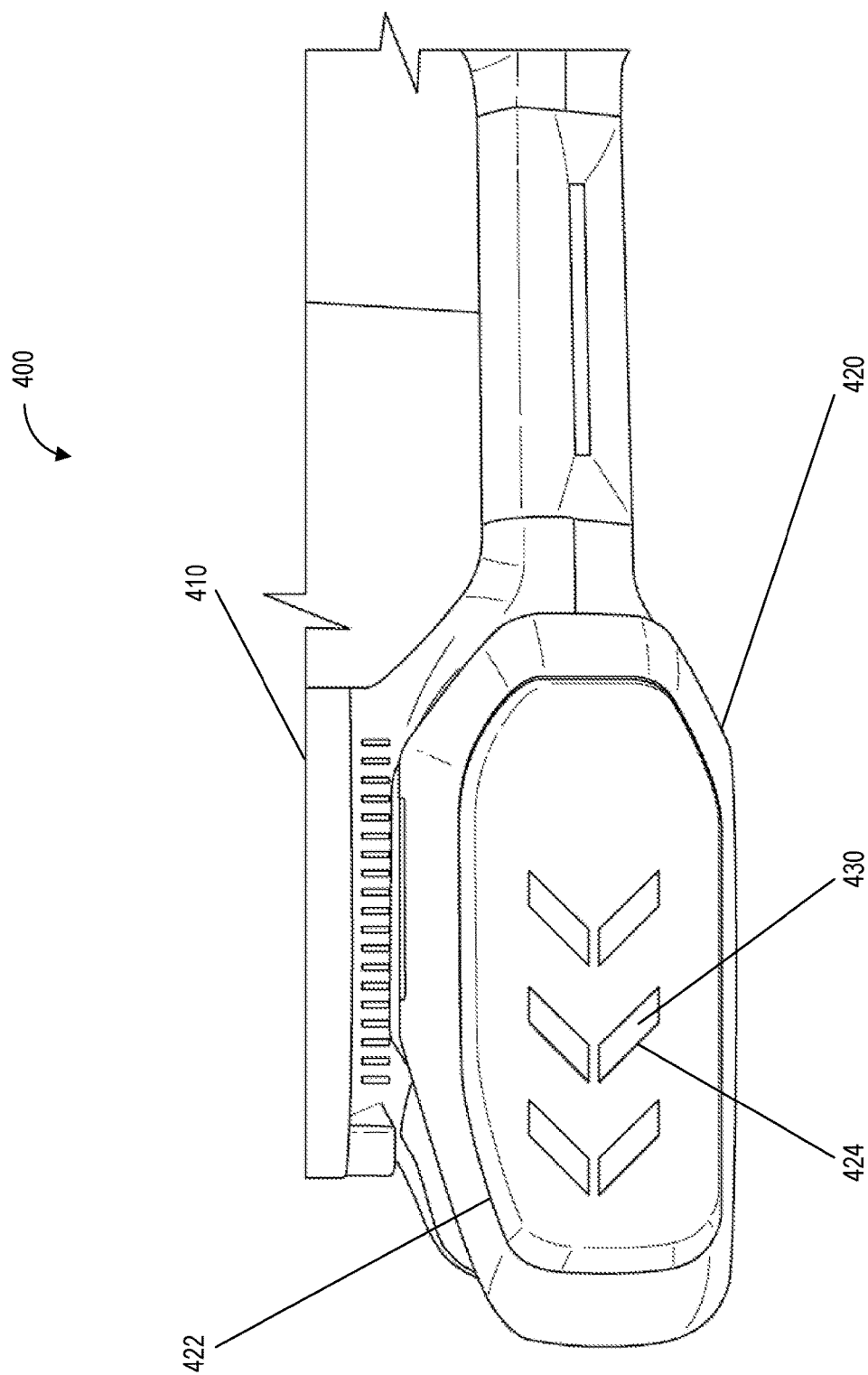
FIG. 4 depicts an example of wheel attachments according to example embodiments of the present disclosure.

FIG. 4 depicts an example of a wheel unit according to example embodiments of the present disclosure. One or more operations and/or functions in FIG. 4 can be implemented and/or performed by one or more devices (e.g., one or more computing devices) or systems including, for example, the operations computing system 104, the vehicle 108, or the vehicle computing system 112, which are shown in FIG. 1. Further, the one or more devices and/or systems in FIG. 4 can include one or more features of one or more devices and/or systems including, for example, the operations computing system 104, the vehicle 108, or the vehicle computing system 112, which are depicted in FIG. 1.

As illustrated, FIG. 4 shows a wheel unit system 400 including a vehicle 410, wheel unit 420, a wheel unit stencil 422, one or more wheel unit apertures 424, and one or more indications 430.

In this example, the wheel unit 420 is attached to the vehicle 410 and is configured to either receive one or more signals or data from a computing system associated with the vehicle 410 (e.g., a computing system with one or more features of the vehicle computing system 112 that is depicted in FIG. 1) or determine the state of the wheel unit 420 based on one or more computing systems and/or sensors of the wheel unit 420. Further, the wheel unit 420 can receive one or more signals indicating the state of the vehicle 410 wirelessly or via a wired interconnection between the vehicle 410 and the wheel unit 420. For example, the wheel unit 420 can receive one or more signals indicating that the vehicle 410 is operational and can activate lighting elements in the one or more indications 430 that can emit light to show that the vehicle is operational.

In this example, the wheel unit 420 includes a wheel unit stencil 422 which are configured to be detachable from the wheel unit 420. The wheel unit stencil 422 includes one or more wheel unit apertures 424 through which areas beneath the one or more wheel apertures 424 are visible. For example, the one or more indications 430 can include one or more lighting elements (e.g., LEDs) that can emit light that is visible through the one or more wheel unit apertures 424. In some embodiments, the one or more wheel unit apertures 424 can have a different shape from the shape illustrated in FIG. 4. The one or more wheel unit apertures 424 can be various shapes including: one or more horizontal lines, one or more vertical lines, one or more curves, one or more circles, one or more polygons (e.g., one or more triangles, rectangles, squares, and/or pentagons), and/or one or stars. Furthermore, in some embodiments, the wheel unit stencil 422 can signal to the wheel unit 420 and/or the vehicle 410, the shape and/or pattern that is on the wheel unit stencil 422. For example, the wheel unit stencil 422 can include a contact area that includes information associated with the type of shape on the wheel unit stencil 422. The wheel unit stencil 422 can include an interconnect that, when placed in contact with a portion of the wheel unit 420, will indicate to the wheel unit 420 the shapes and/or patterns on the wheel unit stencil 422.

In some embodiments, the wheel unit system 400 can perform one or more operations including receiving vehicle data that can include information associated with one or more states of a vehicle (e.g., the vehicle 108 that is depicted in FIG. 1). The vehicle can include one or more wheel wells associated with one or more wheel units (e.g., the wheel unit 420 and/or the wheel units 150/152/154/156 which are depicted in FIG. 1) configured to generate one or more indications (e.g., the one or more indications 430) associated with the one or more states of the vehicle. The operations performed by the wheel unit system 400 can also include determining the one or more indications to generate on the one or more wheel units 150/152/154/156 based at least in part on the vehicle data. Furthermore, the operations performed by the wheel unit system 400 can include generating the one or more indications on the one or more wheel units 150/152/154/156.

Figure 5:
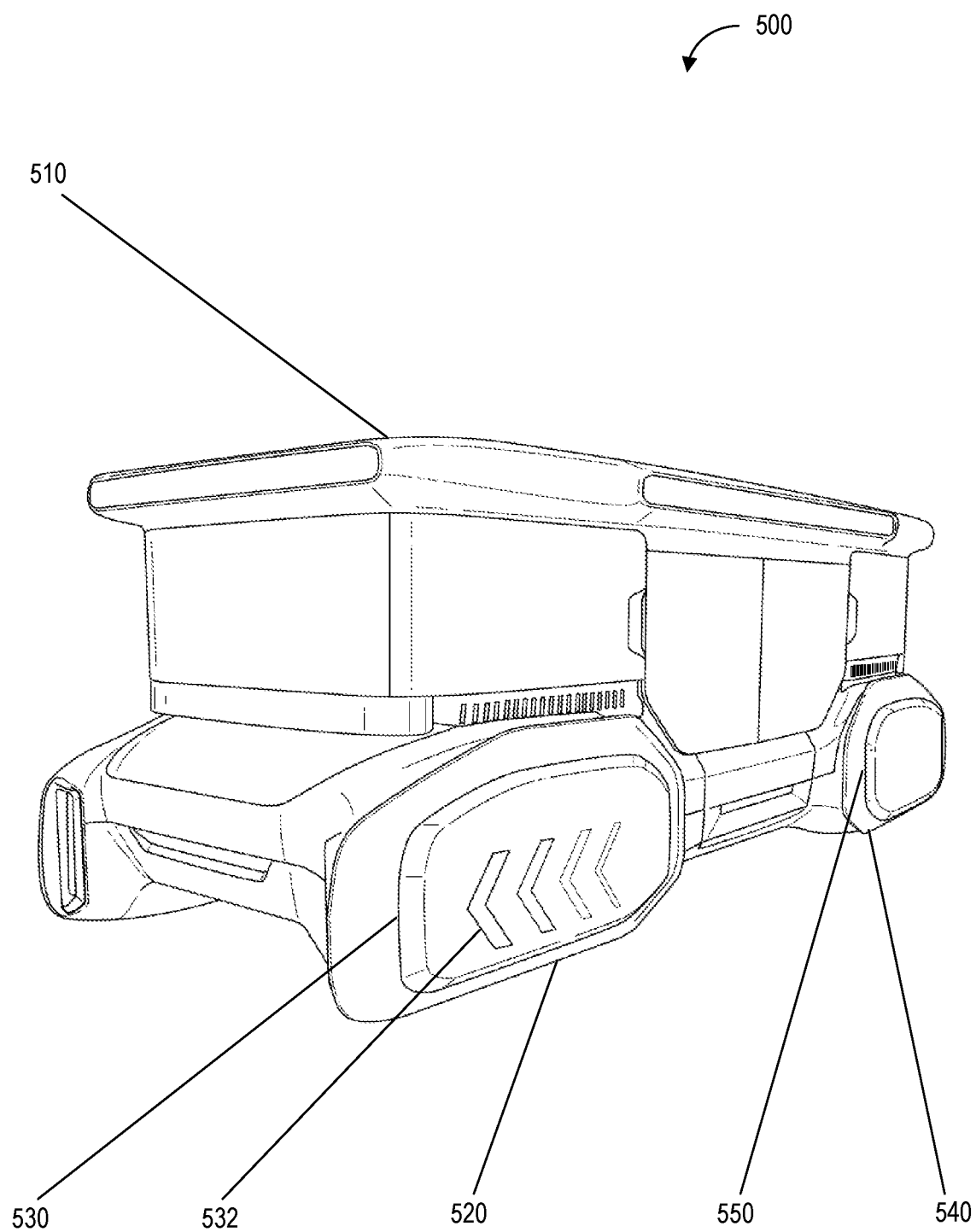
FIG. 5 depicts an example of wheel attachments according to example embodiments of the present disclosure.

FIG. 5 depicts an example of wheel units according to example embodiments of the present disclosure. One or more operations and/or functions in FIG. 4 can be implemented and/or performed by one or more devices (e.g., one or more computing devices) or systems including, for example, the operations computing system 104, the vehicle 108, or the vehicle computing system 112, which are shown in FIG. 1. Further, the one or more devices and/or systems in FIG. 5 can include one or more features of one or more devices and/or systems including, for example, the operations computing system 104, the vehicle 108, or the vehicle computing system 112, which are depicted in FIG. 1.

As illustrated, FIG. 5 shows a wheel unit system 500 including a vehicle 510, a wheel unit 520, a display portion 530, one or more indications 532, and the wheel unit 540.

In this example, the wheel unit 520 and the wheel unit 540 are attached to the vehicle 510 and are configured to perform operations including receiving one or more signals or data from a computing system (e.g., a computing system with one or more features of the vehicle computing system 112 that is depicted in FIG. 1) associated with the vehicle 510 or determining the state of the wheel unit 520 or the wheel unit 540 based in part on one or more computing systems and/or sensors of the wheel unit 520 or the wheel unit 540 respectively. Further, the wheel unit 520 and/or the wheel unit 540 can receive, via a wireless and/or wired from the vehicle 510, one or more signals indicating the state of the vehicle 510 wirelessly and/or via a wired interconnection between the vehicle 510 and the wheel unit 520 or the wheel unit 540. Furthermore, the wheel unit 520 and the wheel unit 540 can communicate with one another so that one or more indications displayed on the wheel unit 520 and/or the wheel unit 540 are coordinated. For example, when the vehicle 510 is travelling forwards, the wheel unit 540 can generate four indications (e.g., four vertically aligned chevrons) that are displayed on the wheel unit 540 and at the same time, the wheel unit 520 can display no indications. The four indications on the wheel unit 540 can include four vertically aligned chevrons that are illuminated and animated to move horizontally across the display portion 550 in the direction of the wheel unit 520. When the first indication of the four indications on the wheel unit 540 arrives at the edge of the display portion 550, the first indication can fade away, leaving three indications on the display portion 550. As the first indication fades away on the display portion 550 an indication can be displayed on the previously blank display portion 530 of the wheel unit 520. The four indications can then continue to move from the wheel unit 540 to the wheel unit 520 as the vehicle 510 travels forward.

In some embodiments, the wheel unit system 500 can perform one or more operations including receiving vehicle data that can include information associated with one or more states of a vehicle (e.g., the vehicle 510 and/or the vehicle 108 that is depicted in FIG. 1). The vehicle can include one or more wheel wells associated with one or more wheel units (e.g., the wheel unit 520 and/or the wheel units 150/152/154/156 which are depicted in FIG. 1) configured to generate one or more indications (e.g., the one or more indications 532) associated with the one or more states of the vehicle. The operations performed by the wheel unit system 500 can also include determining the one or more indications to generate on the one or more wheel units 150/152/154/156 based at least in part on the vehicle data. Furthermore, the operations performed by the wheel unit system 500 can include generating the one or more indications on the one or more wheel units 150/152/154/156.

FIG. 6 depicts a flow diagram of an example method of using wheel units according to example embodiments of the present disclosure. One or more portions of a method 600 can be implemented by one or more devices (e.g., one or more computing devices) or systems including, for example, the operations computing system 104, the vehicle 108, or the vehicle computing system 112, shown in FIG. 1. Moreover, one or more portions of the method 600 can be implemented as an algorithm on the hardware components of the devices described herein (e.g., as in FIG. 1) to, for example, generate indications on wheel units of a vehicle. FIG. 6 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure.

At 602, the method 600 can include receiving vehicle data including information associated with one or more states of a vehicle. Further, the vehicle can include one or more wheel wells associated with one or more wheel units (e.g., one or more devices that can be attached to the one or more wheel wells) configured to generate one or more indications associated with the one or more states of the vehicle. For example, the vehicle computing system 112 can determine one or more states of the vehicle 108 (e.g., vehicle velocity, acceleration, location, and/or direction of travel) and can transmit (e.g., via a wired or wireless connection) vehicle data including some of the one or more states of the vehicle to the one or more wheel units 150/152/154/156. By way of further example, one or more sensors of the wheel units 150/152/154/156 can detect various states of the vehicle 108 (e.g., vehicle velocity, acceleration, location, and/or direction of travel) and generate vehicle data that can be used by the wheel units 150/152/154/156.

In some embodiments, the one or more wheel units can include one or more lighting elements configured to illuminate based at least in part on the vehicle data. For example, each of the one or more wheel units 150/152/154/156 can include one or more halogen light bulbs that can emit light based at least in part on the vehicle data. In some implementations, the intensity of the illumination can be based at least in part on the vehicle data. For example, vehicle data indicating a high velocity (e.g., velocity exceeding one hundred kilometers per hour) can result in a higher intensity of emitted light. By way of further example, vehicle data indicating the time of day can be used to adjust the intensity of the light emitted by the one or more indications. For example, the light emitted by one or more indications of the one or more wheel units 150/152/154/156 during the day can be more intense than the light emitted at night.

In some embodiments, the one or more lighting elements can cast light on a portion of ground (e.g., project light onto the ground) proximate to the vehicle. For example, to indicate that the vehicle 108 will turn right, the one or more lighting elements on the one or more wheel units 150/152/154/156 on the right side of the vehicle can project light onto the ground surface on the right side of the vehicle 108.

In some embodiments, the vehicle data can further include information associated with one or more states of an environment proximate to the vehicle (e.g., the amount of light in the environment, the slope of the ground, and/or the location of objects proximate to the vehicle), an occupancy status of the vehicle (e.g., a number of passengers in the vehicle), a velocity of the vehicle, an acceleration of the vehicle, a deceleration of the vehicle, a current direction of travel of the vehicle, and/or a future direction of travel of the vehicle (e.g., a planned turn for the vehicle).

In some embodiments, the one or more wheel units can be attached to the one or more wheel wells by one or more attachment elements of the one or more wheel units. Further, in some embodiments, the one or more attachment elements can include one or more magnetic attachments, one or more clasps, one or more screws, one or more bolts, and/or one or more studs. Furthermore, the one or more wheel units can be detachable from the one or more wheel wells, thereby facilitating replacement and/or repair of the one or more wheel units. For example, the one or more wheel units 150/152/154/156 can be attached to the vehicle 108 using a clasp with a specific shape that fits into a corresponding specifically shaped receiving portion of the vehicle 108.

At 604, the method 600 can include determining the one or more indications to generate on the one or more wheel units based at least in part on the vehicle data. For example, the one or more wheel units 150/152/154/156 can receive vehicle data from the vehicle computing system 112. The vehicle data can include information indicating that the vehicle 108 will make a right turn within five seconds. Based on the information that the vehicle 108 is going to make a right turn, the vehicle computing system 112 can determine that the one or more indications (e.g., displaying different symbols including directional arrows, displaying different light patterns including flashing lights, displaying different colors on the one or more wheel units 150/152/154/156) associated with a right turn will be generated by the one or more wheel units 150/152/154/156.

In some embodiments, determining a size and/or shape of the one or more indications can be based at least in part on the vehicle data and can be used in determining the one or more indications to generate on the one or more wheel units based at least in part on the vehicle data. For example, the vehicle computing system 112 can determine that the one or more indications of the one or more wheel units 150/152/154/156 will be in the shape of a circle when the vehicle 108 is travelling and in the shape of a square when the vehicle 108 is not travelling. Furthermore, the size of the one or more indications of the one or more wheel units 150/152/154/156 can be a first smaller size when the vehicle 108 is stationary and a second larger size when the vehicle 108 is travelling.

In some embodiments, a size, a shape, and/or a color of the one or more indications can be based at least in part on a velocity of the vehicle, an acceleration of the vehicle, or a deceleration of the vehicle. For example, the vehicle computing system 112 can determine that the shape of an indication will be a circle and that the size of the circle will increase when the vehicle 108 slows down and that the size of the circle will decrease when the vehicle 108 accelerates. By way of further example, the vehicle computing system 112 can determine that the shape of an indication will be arrow pointing in the direction of travel of the vehicle 108 and that the shape of the arrow will elongate (e.g., stretch) along the horizontal axis and that the arrow tip will become sharper when the velocity of the vehicle 108 increases and that the shape of the arrow will compress along the horizontal axis and that the arrow tip will become blunter when the velocity of the vehicle 108 decreases. By way of further example, the vehicle computing system 112 can determine that the color of an indication will be green when the vehicle 108 is accelerating and that the color of the one or more indications will be red when the vehicle 108 is decelerating.

In some embodiments, a size of the one or more indications can include one or more indications of a default size when the vehicle is stationary or traveling at a constant velocity, one or more indications of an increased size compared to the default size when the vehicle accelerates, or one or more indications of a decreased size compared to the default size when the vehicle decelerates. For example, the vehicle computing system 112 can determine that the size of the one or more indications of the one or more wheel units 150/152/154/156 (e.g. the size of a set of vertical lines) can increase when the vehicle data indicates that the vehicle is accelerating and that the size of the one or more indications can decrease when the vehicle data indicates that the vehicle is decelerating. Furthermore, in some implementations, changes in the size of the one or more indications can be indicated dynamically so that the one or more indications can transition from an initial size to a modified size with one or more intermediate sizes indicated between the initial size and the modified size.

In some embodiments, the vehicle can include a first set of the one or more wheel units and a second set of the one or more wheel units. Further, the one or more indications on the first set of the one or more wheel units can be different from the one or more indications on the second set of the one or more wheel units. For example, in an embodiment in which the vehicle 108 has four wheels and four corresponding wheel wells, the wheel unit 150 and the wheel unit 154 can have different indications from the wheel unit 152 and the wheel unit 156 (e.g., when the vehicle 108 is turning left the wheel unit 150 and the wheel unit 154 can generate the one or more indications while the wheel unit 152 and the wheel unit 156 do not generate any indications).

In some embodiments, a number of the one or more indications that is visible on the one or more wheel units can be based at least in part on the vehicle data. For example, in some implementations, each of the one or more wheel units 150/152/154/156 can display three arrows when the vehicle data indicates that a vehicle 108 is about to make a sharp and each of the one or more wheel units 150/152/154/156 can display one arrow when the vehicle 108 is making a turn that is not sharp.

In some embodiments, one or more colors of the one or more indications can be based at least in part on the vehicle data. For example, in some implementations, the color of the one or more indications can be red when the vehicle data indicates that the vehicle 108 is fully occupied with passengers, green when the vehicle data indicates that the vehicle 108 has room for additional passengers, and yellow when the vehicle data indicates that the vehicle is does not have space available for passengers but does have space available for cargo.

In some embodiments, the one or more indications can include one or more symbols to indicate a direction of travel of the vehicle, acceleration of the vehicle, or deceleration of the vehicle. For example, in some implementations, the one or more indications generated on the one or more wheel units 150/152/154/156 can include a different symbol corresponding to different states of the vehicle including the different symbols for acceleration and deceleration of the vehicle 108.

In some embodiments, the one or more symbols can include text symbols (e.g., text indicating that the velocity of the vehicle is "ABOUT TO MOVE"), one or more arrows (e.g., arrows indicating an impending turn by the vehicle), one or more chevrons, one or more straight lines, and/or one or more curved lines.

Further, an orientation of the one or more symbols can be based at least in part on the direction of travel of the vehicle, the acceleration of the vehicle, and/or the deceleration of the vehicle. For example, one or more indications generated on the one or more wheel units 150/152/154/156 can include an triangle that points upwards when the vehicle 108 is stationary, points to the front of the vehicle 108 when the vehicle 108 is travelling forwards, and points to the rear of the vehicle 108 when the vehicle 108 is travelling backwards.

At 606, the method 600 can include generating the one or more indications on the one or more wheel units. For example, the one or more wheel units 150/152/154/156 can generate one or more indications including any combination of one or more symbols (e.g., chevrons, arrows, circles, squares, crosses, or other symbols displayed on a display portion of the wheel unit), text symbols (e.g., text indicating one or more states of the vehicle displayed on display portion of the wheel unit), and/or auditory indications (e.g., musical tones, chimes, beeps, and/or verbal messages generated by a loudspeaker of a wheel unit).

In some embodiments, the one or more indications can include one or more audible indications. Further, the wheel unit system can include one or more loud speakers that can generate one or more audible indications based at least in part on the vehicle data. For example, the one or more wheel units 150/152/154/156 can generate one or more audible indications (e.g., beeping or a pre-recorded message) when the vehicle 108 is turned on.

In some embodiments, a volume and/or rate of the one or more audible indications can be based at least in part on the vehicle data. For example, the volume of one or more audible indications including a beeping sound can increase in based on the distance of the vehicle 108 to one or more detected objects.

In some embodiments, the one or more audible indications can be generated prior to the vehicle commencing travel, changing direction, accelerating, decelerating, or stopping. For example, the one or more wheel units 150/152/154/156 can generate one or more audible indications including a beeping or chiming when the vehicle 108 is about to commence travel from a stationary position.

In some embodiments, the one or more indications can include one or more animated images indicative of a velocity of the vehicle, an acceleration of the vehicle, a deceleration of the vehicle, a current direction of travel of the vehicle, or a future direction of travel of the vehicle. For example, the one or more indications can include one or more animated images of horizontal lines that move horizontally across the one or more wheel units 150/152/154/156 based at least in part on the velocity of the vehicle 108, or one or more animated images of rotating wheels that rotate in a direction based at least in part on the direction in which the vehicle 108 is travelling.

Furthermore, any combination of the one or more indications can be generated. For example, the one or more wheel units 150/152/154/156 can generate one combination of the one or more indications (e.g., one or more visual indications of an arrow; and one or more audible indications including a humming sound) for a first type of action (e.g., the vehicle 108 is accelerating) and a different combination of the one or more indications (e.g., one or more visual indications of a square; and one or more audible indications including music) for a second type of action (e.g., the vehicle 108 is powered on and stationary).

Figure 7:
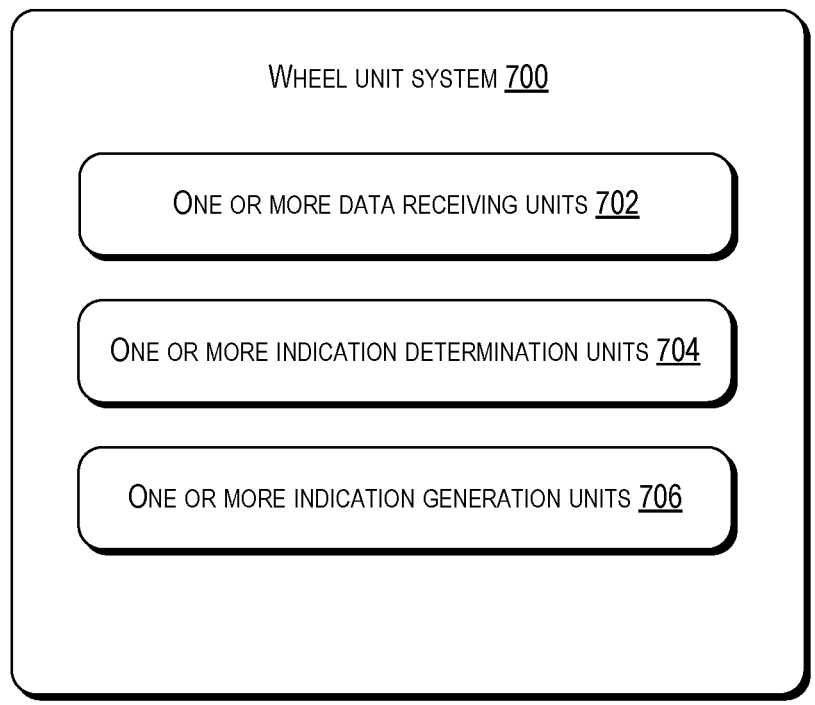
FIG. 7 depicts an example system including units for performance of operations and functions according to example embodiments of the present disclosure.

FIG. 7 depicts an example of a wheel unit system according to example embodiments of the present disclosure. One or more operations and/or functions or operations in FIG. 7 can be implemented and/or performed by one or more devices (e.g., one or more computing devices) or systems including, for example, the operations computing system 104, the vehicle 108, or the vehicle computing system 112, which are shown in FIG. 1. Further, the one or more devices and/or systems in FIG. 7 can include one or more features of one or more devices and/or systems including, for example, the operations computing system 104, the vehicle 108, or the vehicle computing system 112, which are depicted in FIG. 1.

Various means can be configured to perform the methods and processes described herein. For example, a wheel unit system 700 can include one or more data receiving units 702, one or more indication determination units 704, one or more indication generation units 706, and/or other means for performing the operations and functions described herein. In some implementations, one or more of the units may be implemented separately. In some implementations, one or more units may be a part of, or included in, one or more other units. These means can include one or more processors, one or more microprocessors, one or more graphics processing units, one or more logic circuits, one or more dedicated circuits, one or more application-specific integrated circuits (ASICs), programmable array logic, one or more field-programmable gate arrays (FPGAs), one or more controllers, one or more microcontrollers, and/or other suitable hardware. The means can also, or alternately, include software control means implemented with a processor or logic circuitry for example. The means can include or otherwise be able to access memory including, for example, one or more non-transitory computer-readable storage media, such as random-access memory, read-only memory, electrically erasable programmable read-only memory, erasable programmable read-only memory, one or more flash/other memory devices, one or more data registrars, one or more databases, and/or other suitable hardware.

The means can be programmed (e.g., an FPGA custom programmed to operate a wheel unit system) or configured (e.g., an ASIC custom designed and configured to operate a wheel unit system) to perform one or more algorithms for performing the operations and functions described herein. For example, the means (e.g., the one or more data receiving units 702) can be configured to receive vehicle data including information associated with one or more states of a vehicle (e.g., the vehicle 108 that is depicted in FIG. 1) in which the vehicle includes one or more wheel wells associated with one or more wheel units (e.g., the one or more wheel units 150/152/154/156 that are depicted in FIG. 1) configured to generate one or more indications.

The means (e.g., the one or more indication determination units 704) can be configured to determine, the one or more indications to generate on the one or more wheel units based at least in part on the vehicle data. In some implementations, the means (e.g., the one or more indication determination units 704) can be configured to determine one or more indications including in which a size or shape of the one or more indications is modified based at least in part on the vehicle data. Further, a size of the one or more indications can be based at least in part on a velocity of the vehicle, an acceleration of the vehicle, or a deceleration of the vehicle. In some implementations, the means (e.g., the one or more indication determination units 704) can be configured to determine one or more indications in which the size of the one or more indications is a default size when the vehicle is stationary or traveling at a constant velocity, the size of the one or more indications increases from the default size when the vehicle accelerates, or the size of the one or more indications decreases from the default size when the vehicle decelerates. Further, the one or more indications can include one or more audible indications in which a volume or rate of the one or more audible indications is based at least in part on the vehicle data.

Furthermore, the means (e.g., the one or more indication generation units 706) can be configured to generate one or more indications on the one or more wheel units. In some implementations, the means (e.g., the one or more indication generation units 706) can be configured to generate indications including one or more audible indications in which a volume or rate of the one or more audible indications is based at least in part on the vehicle data. Further, the means (e.g., the one or more indication generation units 706) can be configured to generate the one or more audible indications a predetermined amount of time before the vehicle commences travel, changes direction, accelerates, decelerates, or stops.

Figure 8:
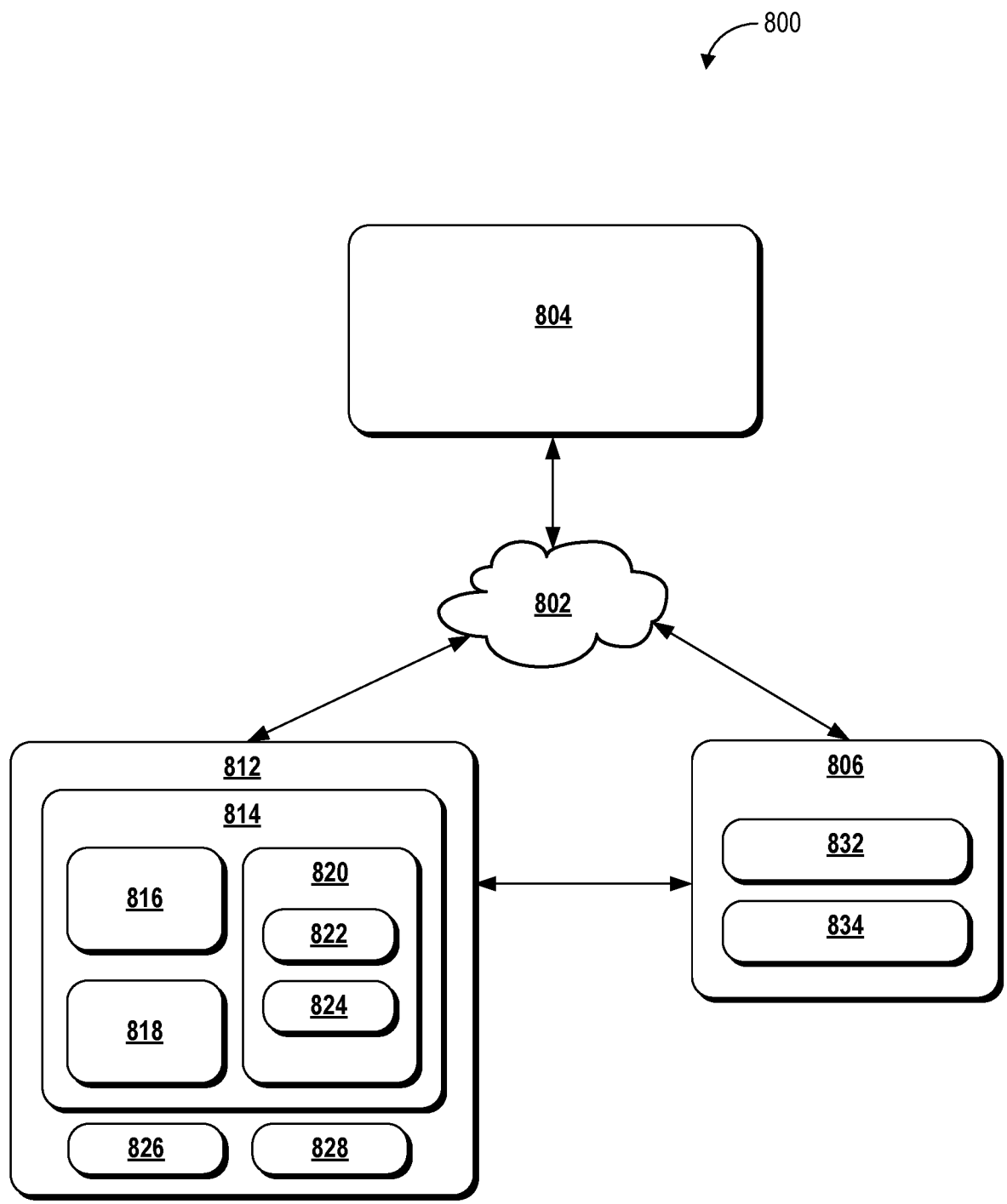
FIG. 8 depicts a diagram of an example system according to example embodiments of the present disclosure.

FIG. 8 depicts a diagram of an example system according to example embodiments of the present disclosure. A system 800 can include a network 802 which can include one or more features of the communications network 102 depicted in FIG. 1; an operations computing system 804 which can include one or more features of the operations computing system 104 depicted in FIG. 1; one or more remote computing devices 806 which can include one or more features of the one or more remote computing devices 106 depicted in FIG. 1; a vehicle computing system 812 which can include one or more features of the vehicle computing system 112 depicted in FIG. 1; one or more computing devices 814; a communication interface 816; one or more processors 818; one or more memory devices 820; memory system 822; memory system 824; one or more input devices 826; one or more output devices 828; one or more input devices 832; and one or more output devices 834.

The vehicle computing system 812 can include the one or more computing devices 814. The one or more computing devices 814 can include one or more processors 818 which can be included on-board a vehicle including the vehicle 108 and one or more memory devices 820 which can be included on-board a vehicle including the vehicle 108. The one or more processors 818 can be any processing device including a microprocessor, microcontroller, integrated circuit, an application specific integrated circuit (ASIC), a digital signal processor (DSP), a field-programmable gate array (FPGA), logic device, one or more central processing units (CPUs), graphics processing units (GPUs), and/or processing units performing other specialized calculations. The one or more processors 818 can include a single processor or a plurality of processors that are operatively and/or selectively connected. The one or more memory devices 820 can include one or more non-transitory computer-readable storage media, such as RAM, ROM, EEPROM, EPROM, flash memory devices, magnetic disks, and/or combinations thereof.

The one or more memory devices 820 can store data or information that can be accessed by the one or more processors 818. For instance, the one or more memory devices 820 which can be included on-board a vehicle including the vehicle 108, can include a memory system 822 that can store computer-readable instructions that can be executed by the one or more processors 818. The memory system 822 can include software written in any suitable programming language that can be implemented in hardware (e.g., computing hardware). Further, the memory system 822 can include instructions that can be executed in logically and/or virtually separate threads on the one or more processors 818. The memory system 822 can include any set of instructions that when executed by the one or more processors 818 cause the one or more processors 818 to perform operations.

For example, the one or more memory devices 820 which can be included on-board a vehicle including the vehicle 108 can store instructions, including specialized instructions, that when executed by the one or more processors 818 on-board the vehicle cause the one or more processors 818 to perform operations such as any of the operations and functions of the one or more computing devices 814 or for which the one or more computing devices 814 are configured, including the operations for receiving vehicle data that includes information associated with one or more states of a vehicle (e.g., the vehicle 108), which can include one or more wheel wells associated with one or more wheel units (e.g., the wheel units 150/152/154/156) configured to generate one or more indications associated with the one or more states of the vehicle; determining the one or more indications to generate on the one or more wheel units based at least in part on the vehicle data; and generating the one or more indications on the one or more wheel units, and/or any other operations and/or functions for operation of a vehicle, as described in the present disclosure.

The one or more memory devices 820 can include a memory system 824 that can store data that can be retrieved, manipulated, created, and/or stored by the one or more computing devices 814. The data stored in memory system 824 can include, for instance, vehicle data (e.g., the vehicle data described in the method 600 depicted in FIG. 6) associated with a vehicle including the vehicle 108; data associated with generating one or more indications on one or more wheel units (e.g., the wheel units 150/152/154/156 depicted in FIG. 1); data associated with user input; data associated with one or more actions and/or control command signals; data associated with users; and/or other data or information. The data in the memory system 824 can be stored in one or more databases. The one or more databases can be split up so that they are located in multiple locales on-board a vehicle which can include the vehicle 108. In some implementations, the one or more computing devices 814 can obtain data from one or more memory devices that are remote from a vehicle, including, for example the vehicle 108.

The system 800 can include the network 802 (e.g., a communications network) which can be used to exchange (send or receive) signals (e.g., electronic signals) or data (e.g., data from a computing device) including signals or data exchanged between computing devices including the operations computing system 804, the one or more remote computing devices 806, and/or the vehicle computing system 812. The network 802 can include any combination of various wired (e.g., twisted pair cable) and/or wireless communication mechanisms (e.g., cellular, wireless, satellite, microwave, and radio frequency) and/or any desired network topology (or topologies). For example, the communications network 802 can include a local area network (e.g. intranet), wide area network (e.g. Internet), wireless LAN network (e.g., via Wi-Fi), cellular network, a SATCOM network, VHF network, a HF network, a WiMAX based network, and/or any other suitable communications network (or combination thereof) for transmitting data to and/or from a vehicle including the vehicle 108.

The one or more computing devices 814 can also include the communication interface 816 used to communicate with one or more other systems which can be included on-board a vehicle including the vehicle 108 (e.g., over the network 802). The communication interface 816 can include any suitable components for interfacing with one or more networks, including for example, transmitters, receivers, ports, controllers, antennas, other hardware and/or software.

The vehicle computing system 812 can also include one or more input devices 826 and/or one or more output devices 828. The one or more input devices 826 and/or the one or more output devices 828 can be included and/or otherwise associated with a human-machine interface system. The one or more input devices 826 can include, for example, hardware for receiving information from a user, such as a touch screen, touch pad, mouse, data entry keys, speakers, and/or a microphone suitable for voice recognition. The one or more output devices 828 can include one or more display devices (e.g., display screen, CRT, LCD) and/or one or more audio output devices (e.g., loudspeakers). The display devices and/or the audio output devices can be used to facilitate communication with a user. For example, a human operator (e.g., associated with a service provider) can communicate with a current user of a vehicle including the vehicle 108 via at least one of the display devices and the audio output devices.

The one or more remote computing devices 806 can include various types of computing devices. For example, the one or more remote computing devices 806 can include a phone, a smart phone, a tablet, a personal digital assistant (PDA), a laptop computer, a computerized watch (e.g., a smart watch), computerized eyewear, computerized headwear, other types of wearable computing devices, a gaming system, a media player, an e-book reader, and/or other types of computing devices. The one or more remote computing devices 806 can be associated with a user. The one or more remote computing devices 806 described herein can also be representative of a user device that can be included in the human machine interface system of a vehicle including the vehicle 108.

The one or more remote computing devices 806 can include one or more input devices 832 and/or one or more output devices 834. The one or more input devices 832 can include, for example, hardware for receiving information from a user, such as a touch screen, touch pad, mouse, data entry keys, speakers, and/or a microphone suitable for voice recognition. The one or more output devices 834 can include hardware for providing content for display. For example, the one or more output devices 834 can include a display device (e.g., display screen, CRT, LCD), which can include hardware for a user interface.

The technology discussed herein makes reference to computing devices, databases, software applications, and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, computer-implemented processes discussed herein can be implemented using a single computing device or multiple computing devices working in combination. Databases and applications can be implemented on a single system or distributed across multiple systems. Distributed components can operate sequentially or in parallel.

Furthermore, computing tasks discussed herein as being performed at computing devices remote from the vehicle (e.g., the operations computing system and its associated computing devices) can instead be performed at the vehicle (e.g., via the vehicle computing system). Such configurations can be implemented without deviating from the scope of the present disclosure.

While the present subject matter has been described in detail with respect to specific example embodiments and methods thereof, it will be appreciated that those skilled in the art, upon attaining an understanding of the foregoing can readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A method of operating a vehicle, the method comprising:
   receiving vehicle data comprising information associated with one or more states of a vehicle, wherein the vehicle comprises one or more wheel wells associated with one or more wheel units that are attached to and cover at least a portion of the one or more wheel wells and that are configured to generate one or more indications associated with the one or more states of the vehicle;
   determining the one or more indications to generate on the one or more wheel units based at least in part on the vehicle data; and
   generating the one or more indications on the one or more wheel units.

2. The method of claim 1, wherein determining the one or more indications to generate on the one or more wheel units based at least in part on the vehicle data comprises:
   determining at least one of a size or a shape of one or more indications based at least in part on the vehicle data.

3. The method of claim 1, wherein a size, a shape, or a color of the one or more indications is based at least in part on a velocity of the vehicle, an acceleration of the vehicle, or a deceleration of the vehicle.

4. The method of claim 1, wherein the one or more indications comprise one or more indications of a default size when the vehicle is stationary or traveling at a constant velocity, wherein the one or more indications comprise one or more indications of an increased size compared to the default size when the vehicle accelerates, or wherein the one or more indications comprise one or more indications of a decreased size compared to the default size when the vehicle decelerates.

5. The method of claim 1, wherein changes in a size of the one or more indications are indicated dynamically, and wherein the one or more indications transition from an initial size to a modified size with one or more intermediate sizes indicated between the initial size and the modified size.

6. The method of claim 1, wherein a number of the one or more indications that is visible on the one or more wheel units is based at least in part on the vehicle data.

7. The method of claim 1, wherein the one or more indications comprise one or more audible indications.

8. The method of claim 7, wherein a volume or a rate of the one or more audible indications is based at least in part on the vehicle data.

9. The method of claim 7, wherein the one or more audible indications are generated prior to the vehicle commencing travel, changing direction, accelerating, decelerating, or stopping.

10. The method of claim 1, wherein the one or more wheel units comprise one or more lighting elements configured to illuminate based at least in part on the vehicle data.

11. The method of claim 10, wherein the one or more lighting elements are configured to cast light on a portion of a ground surface proximate to the vehicle.

12. The method of claim 1, wherein one or more colors of the one or more indications are based at least in part on the vehicle data.

13. The method of claim 1, wherein the vehicle data further comprises information associated with one or more states of an environment proximate to the vehicle, an occupancy status of the vehicle, a velocity of the vehicle, an acceleration of the vehicle, a deceleration of the vehicle, a current direction of travel of the vehicle, or a future direction of travel of the vehicle.

14. The method of claim 1, wherein the one or more indications comprise one or more animated images corresponding to a velocity of the vehicle, an acceleration of the vehicle, a deceleration of the vehicle, a current direction of travel of the vehicle, or a future direction of travel of the vehicle.

15. A computing device comprising:
   one or more processors;
   a memory comprising one or more computer-readable media, the memory storing computer-readable instructions that when executed by the one or more processors cause the one or more processors to perform operations comprising:
      receiving vehicle data comprising information associated with one or more states of a vehicle, wherein the vehicle comprises one or more wheel wells associated with one or more wheel units that are attached to and cover at least a portion of the one or more wheel wells and that are configured to generate one or more indications associated with the one or more states of the vehicle;
      determining the one or more indications to generate on the one or more wheel units based at least in part on the vehicle data; and
      generating the one or more indications on the one or more wheel units.

16. The computing device of claim 15, wherein the one or more wheel units comprises a first set of the one or more wheel units and a second set of the one or more wheel units, and wherein the one or more indications on the first set of the one or more wheel units are different from the one or more indications on the second set of the one or more wheel units.

17. The computing device of claim 15, wherein the one or more wheel units are attached to the one or more wheel wells by one or more attachment elements of the one or more wheel units, and wherein the one or more attachment elements comprise one or more magnetic attachments, one or more clasps, one or more screws, one or more bolts, or one or more studs.

18. One or more tangible non-transitory computer-readable media storing computer-readable instructions that when executed by one or more processors cause the one or more processors to perform operations, the operations comprising:

receiving vehicle data comprising information associated with one or more states of a vehicle, wherein the vehicle comprises one or more wheel wells associated with one or more wheel units that are attached to and cover at least a portion of the one or more wheel wells and that are configured to generate one or more indications associated with the one or more states of the vehicle;

determining the one or more indications to generate on the one or more wheel units based at least in part on the vehicle data; and generating the one or more indications on the one or more wheel units.

19. The one or more tangible non-transitory computer-readable media of claim 18, wherein the one or more indications comprise one or more symbols to indicate a direction of travel of the vehicle, acceleration of the vehicle, or deceleration of the vehicle.

20. The one or more tangible non-transitory computer-readable media of claim 19, wherein the one or more symbols comprise one or more text symbols, arrows, chevrons, straight lines, or curved lines, and wherein an orientation of the one or more symbols is based at least in part on at least one of the direction of travel of the vehicle, the acceleration of the vehicle, or the deceleration of the vehicle.

* * * * *